United States Patent [19]

Chauvel

[11] Patent Number: 4,975,947
[45] Date of Patent: Dec. 4, 1990

[54] SYSTEM TO SHARE THE DSP COMPUTATION RESOURCES

[75] Inventor: Gerard Chauvel, Antibes, France

[73] Assignee: Texas Instruments Incorporated, Dallas, Tex.

[21] Appl. No.: 313,761

[22] Filed: Feb. 22, 1989

[51] Int. Cl.⁵ .............................................. H04M 9/06
[52] U.S. Cl. .................................... 379/334; 379/242; 370/56
[58] Field of Search ........................ 379/242, 333, 334; 370/53, 56, 58, 62

[56] References Cited

U.S. PATENT DOCUMENTS

| 3,492,435 | 1/1970 | Inose et al. | 379/333 X |
| 3,819,869 | 6/1974 | Lamartina et al. | 379/333 X |
| 4,571,721 | 2/1986 | Yasui et al. | 379/333 X |

FOREIGN PATENT DOCUMENTS

| 0216488 | 4/1987 | European Pat. Off. |
| 87/01547 | 3/1987 | World Int. Prop. O. |

OTHER PUBLICATIONS

R. Pickvance, "A Single Chip Digital Signal Processor. Part 1. Architecture and Addressing", Electronic Engineering, vol. 57, No. 698, Feb. 1985, pp. 53-56, 59, 63.

Primary Examiner—James L. Dwyer
Attorney, Agent, or Firm—William E. Hiller; N. Rhys Merrett; Melvin Sharp

[57] ABSTRACT

Device for processing telephonic signals for putting in communication a plurality of subscribers by means of a telephone exchange employing circuits on cards of subscribers, comprising digital signal processing devices adapted to create filtering functions for the purpose of connecting the subscribers to one another, characterized in that it comprises, associated with said telephone exchange, at least two digital signal processing devices (15, 16) common to a plurality of lines of subscribers (10a-10n, 11a-11n), each connected, on one hand, to the telephone exchange (17) and, on the other hand, to a group of lines of subscribers and adapted to process the signals coming from said corresponding groups of lines of subscribers in shared time so as to effect calculations of filtering functions associated with the various subscribers in accordance with frequencies assigned to the calculations of filter stages adapted to constitute said filtering functions and the chronology of reception of said signals of subscribers.

18 Claims, 19 Drawing Sheets

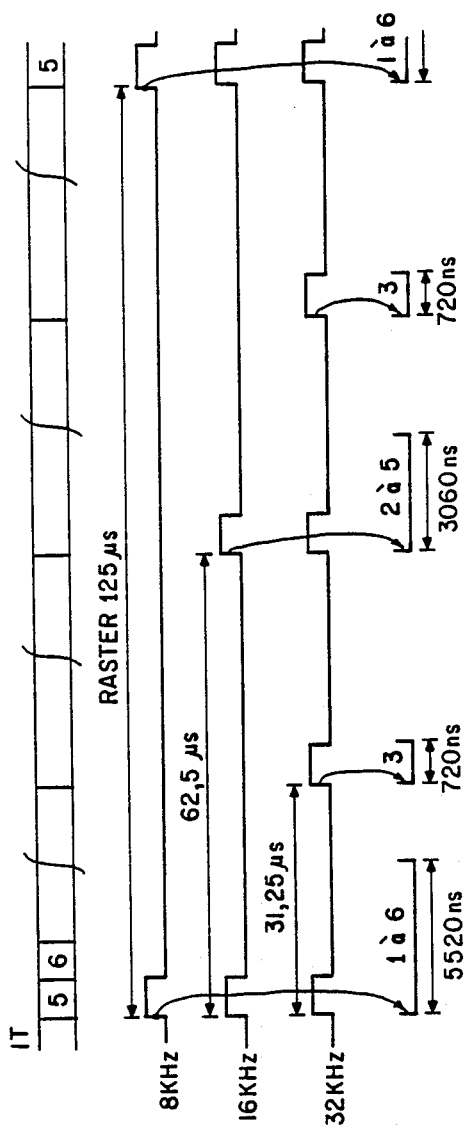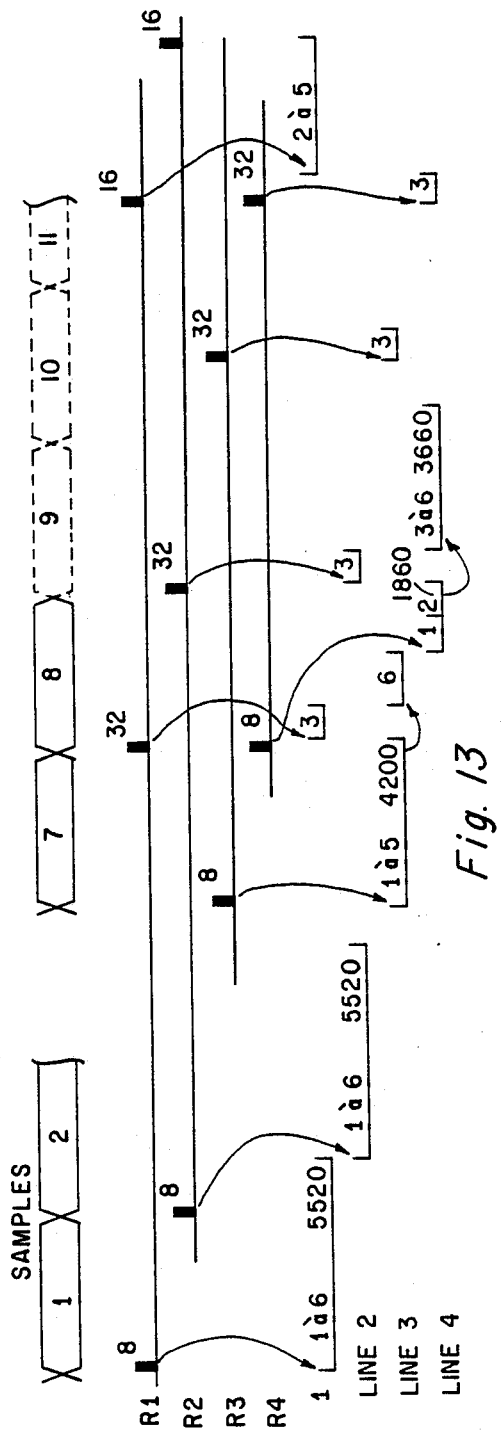
Fig. 12
Fig. 13

SYSTEM TO SHARE THE DSP COMPUTATION RESOURCES

In subscriber card systems for telephone exchanges, the circuits used for connecting two subscribers to one another to create digital filtering function using dedicated digital processing circuits are called hereafter DSP. An example of a DSF device is described in U.S. Pat. Nos. 4,577,282 issued Mar. 18, 4,491,910 issued Jan. 1, 1985 and in European Patent Publication No. EP-A-0086307 published Aug. 24, 1983.

DSP is generally controlled by a clock belonging to the exchange. This clock defines the calculation period With existing architectures, this clock is fast enough to process the calculation correction corresponding to the connection of the two subscribers.

Technological advances now make it possible to perform high-speed calculations, but this advantage cannot be used in existing architectures.

The aim of the present invention is therefore to create an architecture making it possible to use all capabilities of new integrated circuit technologies in terms of speed and to share a filter processing unit among several users.

The aim of the invention is also to create a system which can process, for example, eight or more subscriber channels using a silicon surface slightly exceeding that of a DSP which processes only one subscriber channel.

The invention refers to a telephone signal-processing device for placing several subscribers in communication using a telephone exchange with circuits on subscriber cards, comprising digital signal-processing devices designed to develop filtering functions for the purpose of connecting the subscribers to one another, characterized in that it comprises, associated with said telephone exchange, digital processing devices common to a plurality of subscriber lines, each connected, on the one hand, to the telephone exchange and, on the other hand, to a group of subscriber lines and adapted to process the signals coming from said corresponding groups of subscriber lines in shared time so as to perform calculations of filtering functions associated with the various subscribers in accordance with the frequencies assigned to the calculations of filter stages adapted to constitute said filtering functions and the reception chronology of said subscriber signals.

The invention will be more clearly understood by reading the following description given in reference to the attached figures, provided for illustration only and in which:

FIG. 12 is a timing diagram of the calculations corresponding to a TI sample of a raster;

FIG. 13 is a diagram showing an example of a sample calculation sequence;

Figure 28:
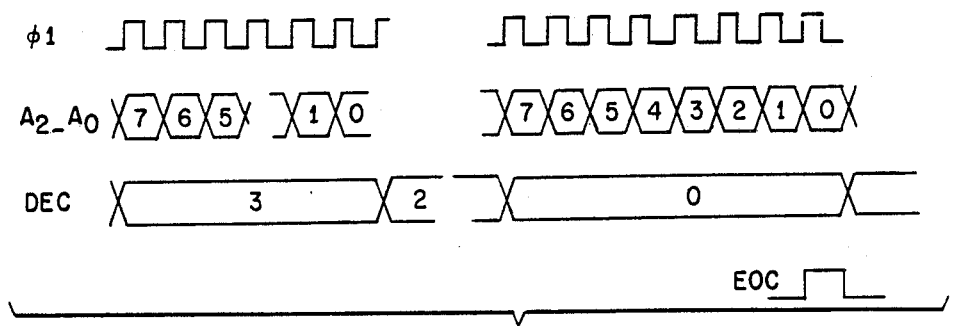
FIG. 28 is a diagram depicting the sequence of the microcodes of the CROM memory.
Figure 29:
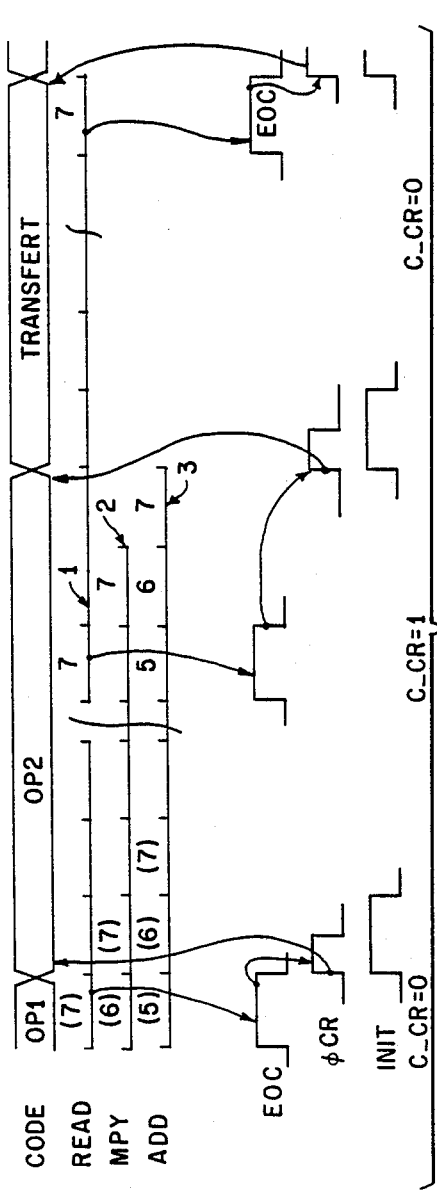
FIG. 29 is a diagram depicting the changing sequence of microcode.
Figure 30:
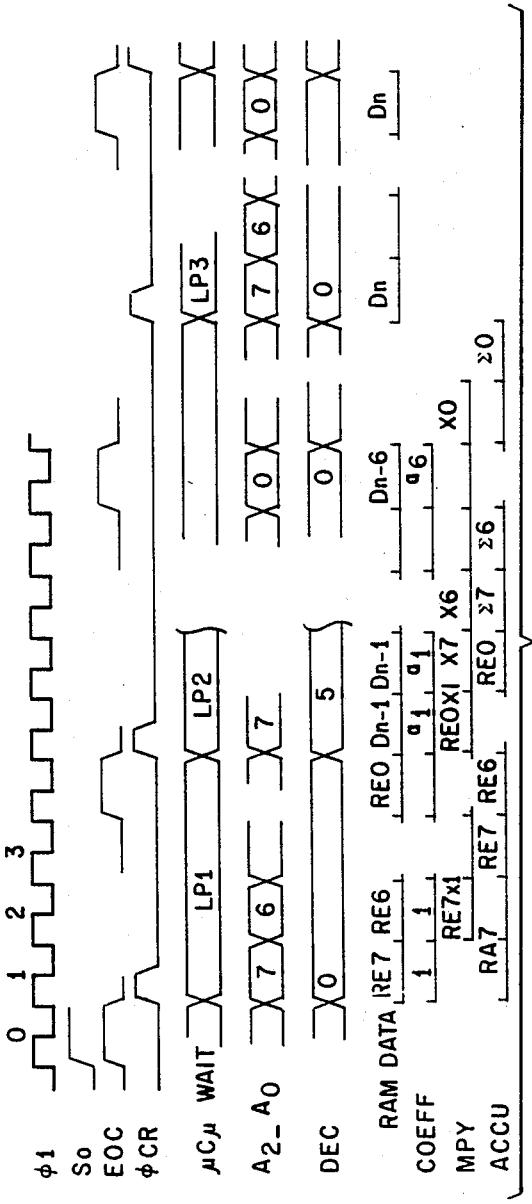

and FIG. 30 is a diagram according to the time representing the successive execution of the microcodes in the device described in reference to FIGS. 22 to 29.

Figure 1:
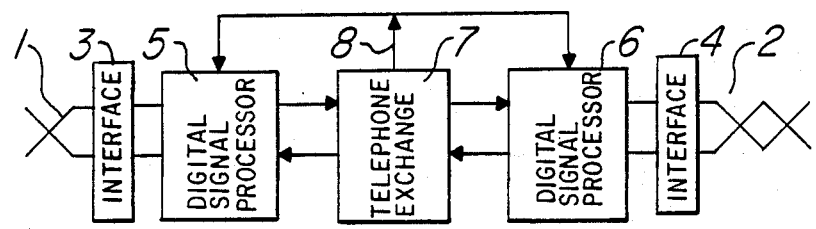
FIG. 1 is a diagram showing how two subscribers are connected by a standard telephone exchange with subscriber cards.

The diagram of FIG. 1 is a standard connection diagram between two subscriber lines (1, 2).

Each of the subscriber lines (1, 2) is connected to corresponding line interface L/I (3, 4).

Each interface is connected to [one of] digital signal processors (5, 6).

Each digital signal processor or DSP creates the filtering and transformation of the output signal of corresponding interface (3, 4), into a digital signal. Processors (5, 6) are in turn connected to telephone exchange (7) which produces at one of its outputs (8) a 2 MHz clock signal which is the control signal of digital signal processors (5, 6).

This clock signal may sometimes be faster, but it is in any case not frequent enough to maximize the use of the speed capabilities of current DSP processor architectures.

In order to increase the processing speed and to therefore be able to share each DSP among several subscriber lines, a solution according to the invention consists of using a local high-speed clock.

Figure 2:
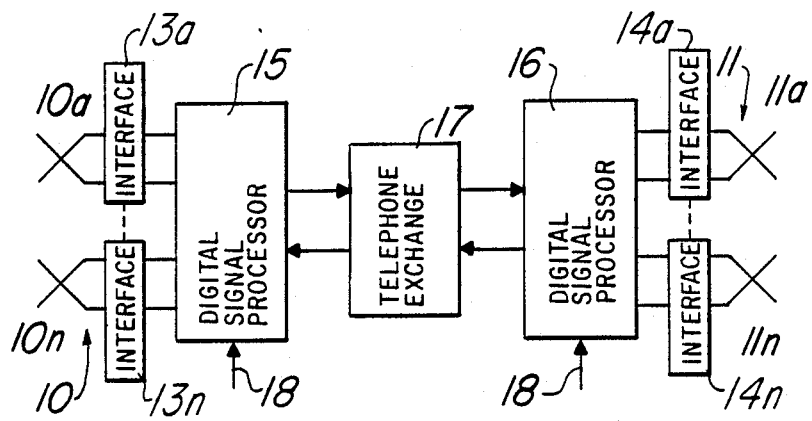
FIG. 2 is a diagram showing how to share a digital signal processor of a circuit card of a telephone exchange among several subscriber lines.

A layout showing this solution is depicted in FIG. 2.

The installation shown in this figure has two groups (10 and 11) of several subscriber lines (10a–10n and 11a–11n) connected via corresponding interface circuits (13a–13n, 14a–14n) to DSP processors (15, 16) common to each group of lines.

DSPs (15 and 16) are in turn connected to telephone exchange (17) and are controlled by local clock (18).

The samples which transit between each of DSPs (15, 16) and exchange (17) are at a frequency, for example, of 8 kHz, but they are synchronous with the clock signal frequency of 2 MHz from exchange (17).

Seen from the exchange, the processing should be synchronous with a frequency of 2 MHz from the exchange.

For this purpose, it is possible:

(a) to generate a local high-speed clock signal using a phase locking system PLL and (b) to process the information with the local clock and to resynchronize the calculation results to the clock frequency from the telephone exchange.

The first solution which uses the phase locking system is certainly the simplest to achieve at the architectural level, since it allows the calculation to be shared using a synchronous method.

However, to increase the clock frequency from 2 MHz to 32 MHz, for example, phase locking system PLL must be provided, and this is virtually impossible at the aforementioned frequencies using new 1-$\mu$ CMOS technologies.

The second solution consists of using a local clock without phase relation with the clock of the exchange and of solving the problems of sharing the DSP and synchronously restoring the samples of signals using an adapted circuitry which will be described below.

Figure 3:
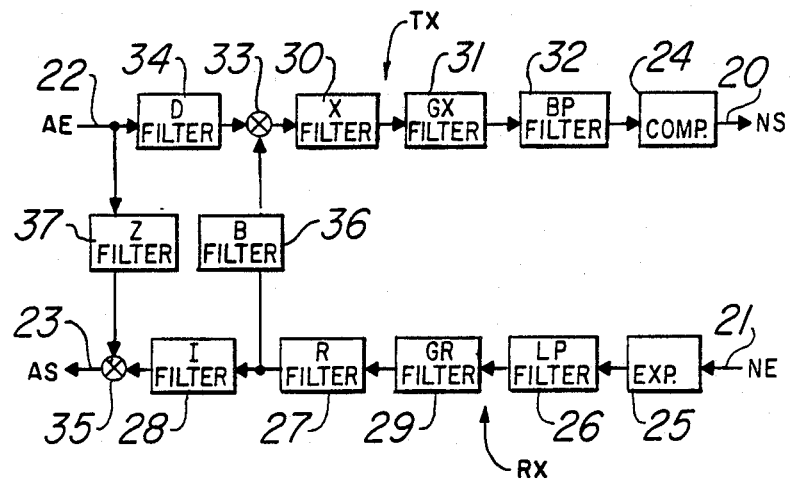
FIG. 3 illustrates the filtering function regarding the shared digital part of the use of the digital signal processor.

However, before describing in detail the circuits using this second solution, we will describe, in reference to FIG. 3, the calculation function which should be performed in the DSP to carry out the filtering.

FIG. 3 shows the filtering function to be created regarding only the digital part which will share the use of the DSP.

The filter shown in this figure is part of one of the DSP (15, 16) and has two connections NE, NS (20, 21) connected to exchange (17) and two connections AE, AS (22, 23) connected to analog-digital or digital-analog (not shown) converters which are part of interface circuits (13a–13n, 14a–14n) (FIG. 2).

This filter comprises compression unit (24) and expansion block (25) connected to the telephone exchange.

For example, each sample E applied to terminal (21) from the exchange and having a frequency of 8 kHz is converted into a digital signal of 8 to 14 or 16 bits according to a compression law know as law A or law $\mu$.

The same is true for the compression in the opposite direction.

Each decompressed sample of the receiving channel is processed by digital filters LP, R, and I (26, 27, and 28) which increase the sampling rate from 8 kHz to 32 kHz.

Filter LP (26) is an infinite impulse response IIR type or recursive type.

The receiving channel also has filter GR 29 placed between filters (26, 27).

The transmission channel has filter X (30), filter GX (31) and filter BP (32) connected in this order between adder (33) and compressor (24).

Filter BP (32) is of type IIR or recursive type like filter LP of the receiving channel All other filters are finite impulse response FIR type.

The transmission channel also has filter D (34) connected between adder (33) and terminal (22) whereas the transmission channel has adder (35) connected between filter I (28) and terminal (23).

Filter B (36) is placed between the transmission and receiving channels and is connected between the input of filter I (28) of the receiving channel and adder (33) of the transmission channel and filter Z (37) connected between the input of filter D (34) of the transmission channel and adder (35) of the receiving channel.

Figure 4:
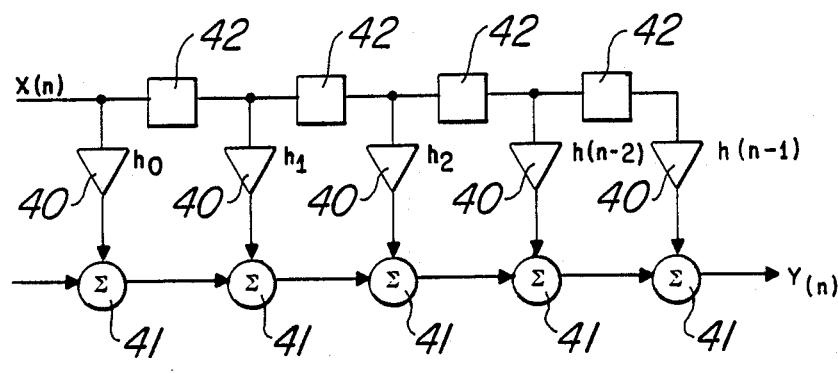
FIG. 4 illustrates a Finite Impulse Response (FIR) filter used in the present invention.

In FIG. 4 we have shown finite impulse response FIR filter, defined mathematically by the relationship:

$$x(n-(N-1)).h(N-1) + \ldots + X(n-2).h(N-2) + X(n-1).h(N-1) + Xn.ho = Yn$$

N is the number of coefficients of the filter and n the chronological order of the signal samples to be processed, in which Xn is the input sample of the filter, $X(n-1) \ldots X(n-(N-1))$ are the samples which were received during the preceding calculations.

Sample Xn is multiplied by its ho coefficient in multiplier (40), and the result is placed in accumulator (41).

Sample Xn−1 received during the preceding cycle is multiplied by coefficient h(N−1) in corresponding multiplier (40), and the result is added to the result of the Xn ho calculation in corresponding accumulator (41).

The preceding samples are combined with hoXn in the same way up to the oldest sample X(N−(N−1)), which is multiplied by its coefficient h(N−1). The result is added to the sum of the preceding samples.

Yn is therefore the value contained in last accumulator (41) of filter FIR of FIG. 4.

It is observed with this process that for each filter calculation N identical cycles must be formed, each one including a sample multiplication, accumulation and shift in associated delay circuit (42).

Table 1 below gives the number of coefficients of each filter of the circuit of FIG. 3.

TABLE 1

| 8 KHz | LP | | | | | | | | BP |
|---|---|---|---|---|---|---|---|---|---|
| 16 KHz | | GR | R | | | B | D + Σ | X | GX |
| 32 KHz | | | | I | Z + Σ | | | | |
| Nb coef | 13 | | 4 | 5 | 4 | 8 | 5 | 4 | 18 |

The calculation of infinite impulse response IIR filter may be divided into that of two finite impulse response FIR filters with the following equations.

$$d(n) = xn + d(n-1)a1 + d(n-2)a2 \ldots$$

$$Y(n) = dnbo + d(n-1)b1 + d(n-2)b2 \ldots$$

in the diagram of FIG. 3.

In these equations:

dn, dn−1, dn−2 are calculated values for each new x(n) value.

a1, a2, b1, b2 are coefficients of the various filter stages.

A sample which is received from the exchange is processed with LP (26) filter which generates result Yn (LP).

The amplitude of this sample is processed using the GR function. This result is used by filter R as a new sample Xn (R) to be processed and so forth.

The architecture of digital signal processor DSP which creates this function and processes the sequencing of the filter calculation for several subscribers will now be described in reference to FIG. 5.

DSP represented in this figure has:

input-output block I/O (45) which is not actually within the scope of the invention and which converts the digital samples into analog samples and vice versa to control the analog interface (FIG. 2);

compressor-expander (46) which is shared by the various channels and which makes it possible to connect the DSP with the exchange;

sequencer (47) controlled by the clock of the exchange and by control signals which define the position of the samples of the various channels in a period of 8 kHz;

and synchronizer (40) associated with sequencer (47) and receiving from the latter orders for calculating the different filters for each channel.

Synchronizer (48) receives calculation orders and synchronizes them relative to a 32 MHz calculation clock and generates an input point in CROM (49) memory which is part of DSP (50) itself when a current calculation is completed.

CROM (49) is in turn connected to central processing unit CPU (51) which communicates with RAM data memory (52) and RAM/ROM coefficients memory (53).

CROM (49) is also connected to address processor (54) for data and coefficient memory management (52, 53).

CPU (51), memories (52, 53), and address processor (54) are part of CROM (49) of DSP (50).

The input point generated by synchronizer (48) gives the address of a first microcode of a microcode sequence corresponding to a filter calculation.

CPU (51) is controlled by the microcode bits. According to the bit configuration, different operations may be carried out by central processing unit (51).

RAM data memory (52) contains N samples corresponding to each filter and coefficients memory (53) contains the coefficients corresponding to the calculation of N stages of a filter.

Address processor (54) manages the data addresses and coefficients to calculate each filter. It selects the addresses where the data items are located and introduces them to CPU (51) in the required order to perform the calculation for the equations described above.

Each of the blocks involved in the construction of DSP (50) will now be described in more detail.

Figure 6:
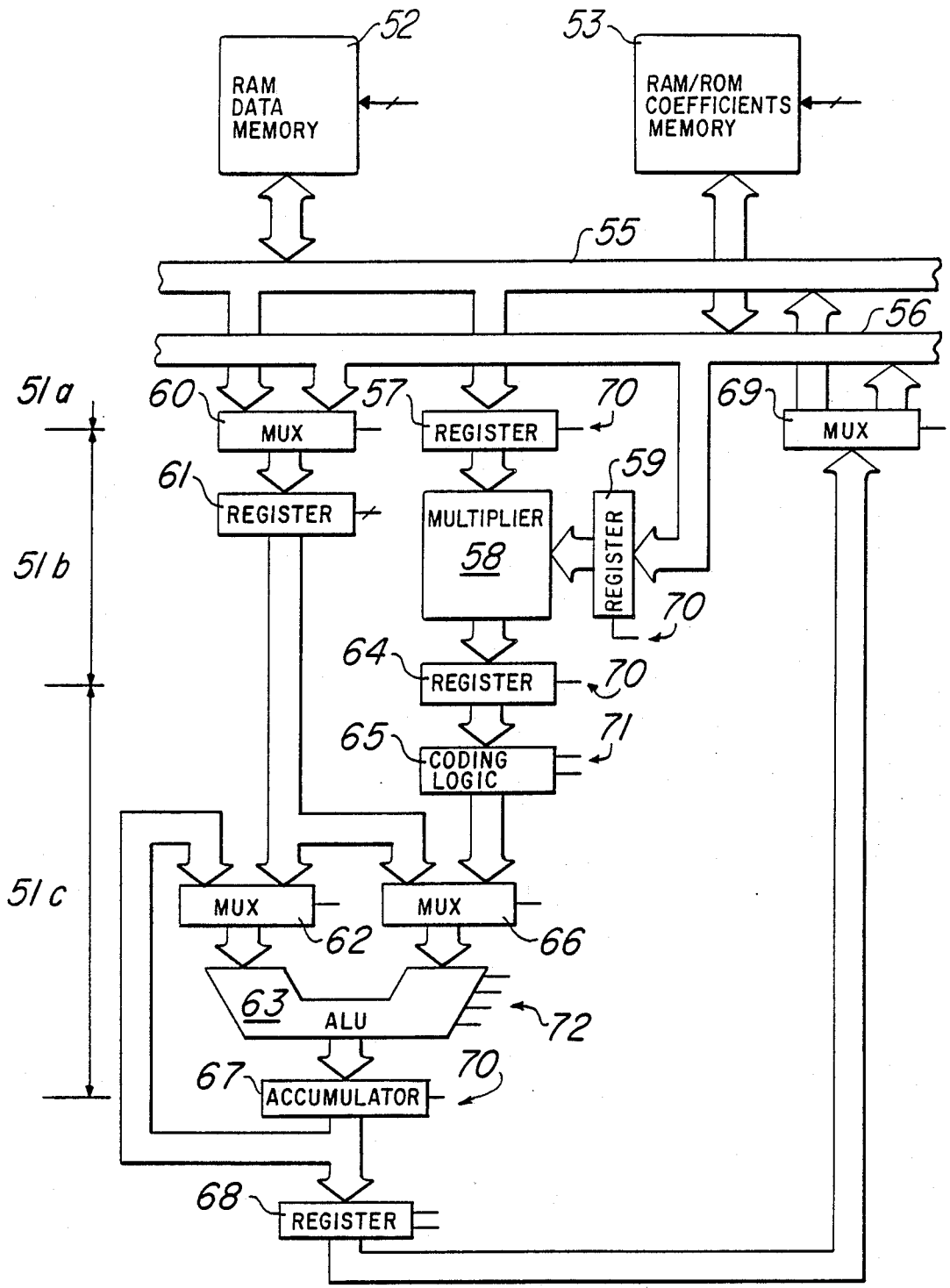
FIG. 6 is a block diagram of the CPU and memories associated with the latter, incorporated in the design of the digital processor of FIG. 5.

The central processing unit, or CPU (51), and the data and coefficient memories (52, 53) are depicted on the detailed diagram of FIG. 6.

Central processing unit (51) is subdivided into reading portion (51a) and accumulation portion (51c) according to the diagram of the filter shown in FIG. 4.

It will be seen in reference to the latter that to perform a filter calculation, for each calculation step, a multiplication must be performed, followed by an addition with the previous result.

The selection for CPU is therefore shown on a pipeline architecture which has three stages:

(1) Reading of a data item and a coefficient in memories (52) and (53).

(2) Multiplication of the data item by the coefficient.

(3) Addition of the result with the preceding result.

To accomplish this, reading portion (51a) of CPU (51) has data bus (55) and coefficient bus (56) respectively connected to memories (52 and 53).

Data bus (55) is moreover connected via shift register (57) to the input of multiplier (58), whereas coefficient bus (56) is connected via shift register (59) to another input of said multiplier (58).

Figure 5:
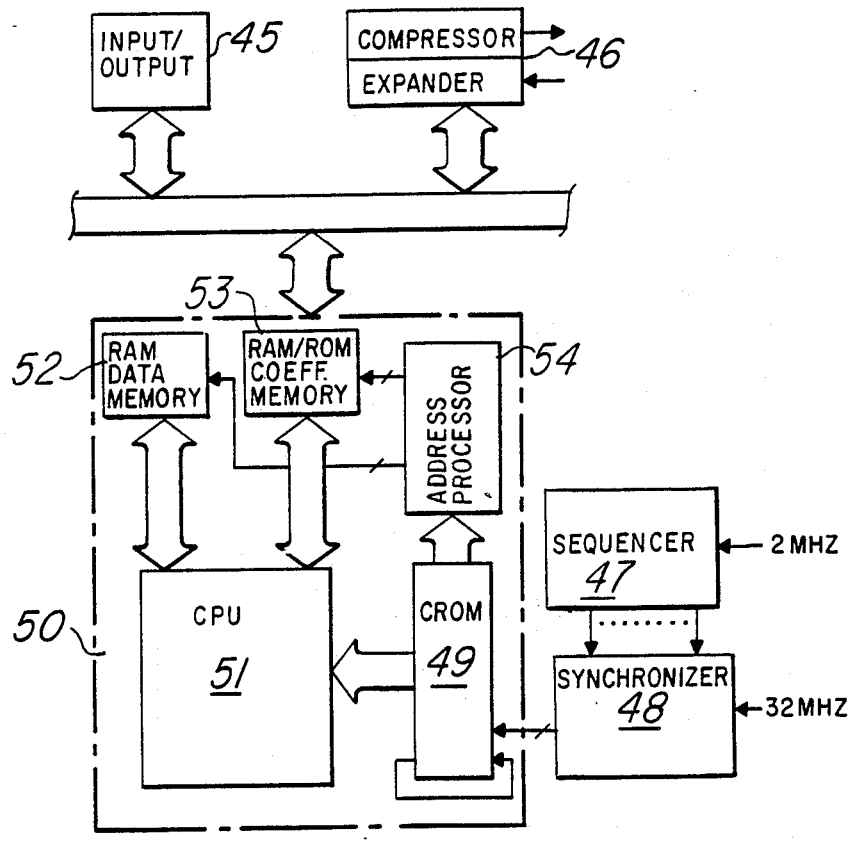
FIG. 5 is a block diagram of the internal architecture of a digital signal processor for creating the calculation function of the filtering and to process the sequencing of this calculation for group of subscribers.

Data bus (55) is also connected via multiplexer (60), also connected to coefficient bus (56) to the input of register (61) whose output is connected via multiplexer (62) to input A of arithmetic or logic unit (63) controlled by CROM (49) (FIG. 5).

The output of multiplier (58) is connected via register (64) of coding logic (65) and multiplexer (66), also connected to register (61) to second input B of arithmetic and logic unit (63).

The output of the arithmetic and logic ALU unit (63) is connected to the input of accumulator (67), the output of which is connected to the input of multiplexer (62) and is connected via shift register (68) and multiplexer (69) to data bus (55) and to coefficient bus (56), and therefore to data memory (52) and to coefficient memory (53).

Figure 7:
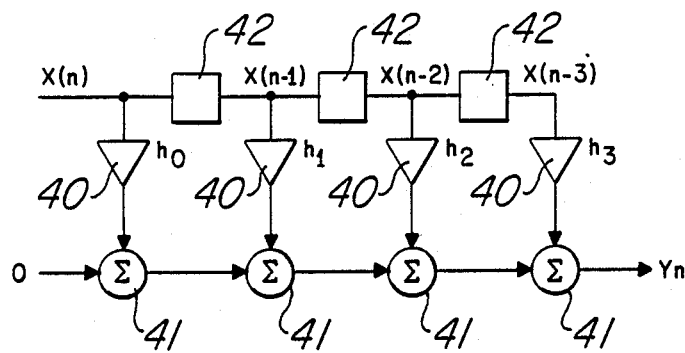
FIG. 7 is a similar diagram to that of FIG. 4 of a FIR filter with four coefficients or stages.
Figure 8:
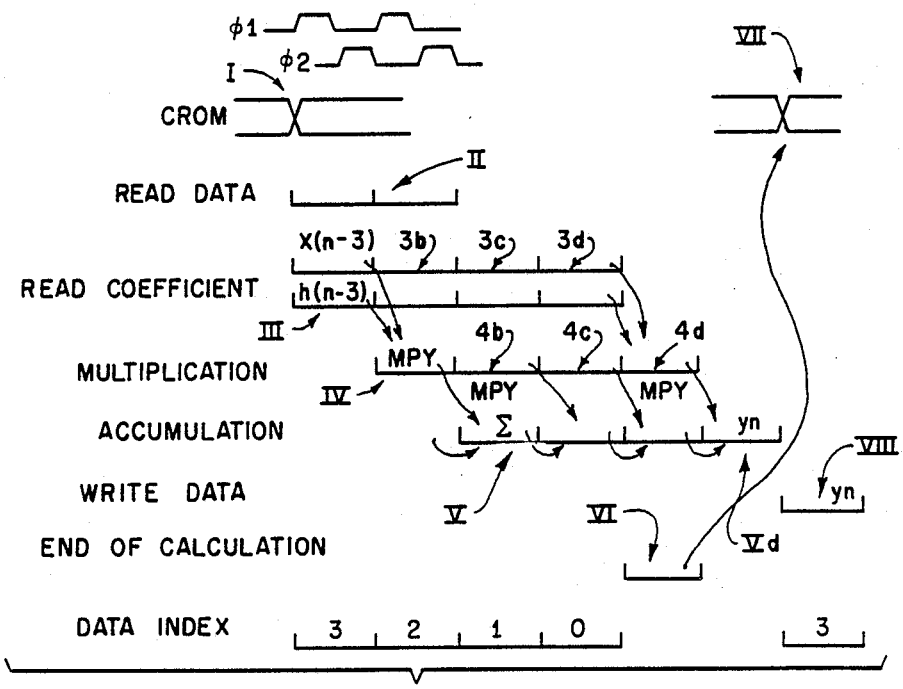
FIG. 8 is a timing diagram of the calculation operations for the filter of FIG. 7.

To explain the functioning of this part of the device of the invention, we will refer to the diagram of FIG. 7 which represents a four-coefficient filter as well as to the timing diagram of FIG. 8 representing the corresponding operations to be carried out.

The beginning of the calculation of the filter is determined by the input point of CROM (49) (FIG. 5) which changes into I in FIG. 8.

The input point is selected by synchronizer (48) (FIG. 5) which will be described below.

The first operation consists of clearing accumulator (67) during two cycles indicated by II in FIG. 8.

During first cycle III, the oldest sample is read in data memory (52) and the corresponding coefficient is read in coefficient memory (53).

Value x(n−3) of the filter of FIG. 7 is loaded into register (57) by clock signal (70) and coefficient h3 is loaded into register (59) by this same clock signal (70).

During the next cycle represented by IV in FIG. 8, multiplier (58) performs operation x(n−3)×h3, and the result is placed in register (64) under the control of clock signal (70). The result is possibly coded by logic (65) under microcode bit control (71) coming from CROM (49).

During the next cycle designated by V in FIG. 8, the result of the multiplication is placed on input 9 of ALU (63), and accumulator (67) is placed in relation with input A of the latter.

CROM 49 (FIG. 5) delivers to ALU (63) signals (72) for selecting function A+B so that ALU performs the addition of the values applied to inputs A and B.

The result of this addition is placed in accumulator (67). The latter is kept in cleared status during cycles III and IV. Result $x(n-3) \times h3 + 0$ is placed in accumulator (67).

According to the same process, during cycles designated by IIIb, IIIc and IIId in FIG. 8, the data and coefficient samples corresponding to the other terms of the filter calculation, are read in corresponding memories (52, 53).

The data and coefficients are multiplied among one another during cycles Vb, Vc, and Vd in accumulator (67).

At the end of the calculation of filter FIR with four coefficients of FIG. 7, result Yn is available in accumulator (67).

Signal (79) coming from address processor (54) (FIG. 5) and applied to CROM (49) indicates the end of the calculation and makes it possible to select a new microcode in CROM (49) to transfer it into data memory (52) of result Yn contained in accumulator (67).

During the cycle designated by VIII in FIG. 8, the contents of the accumulator are placed in data bus (55) then are transferred into data memory (52) under the control of address processor (54).

Figure 9:
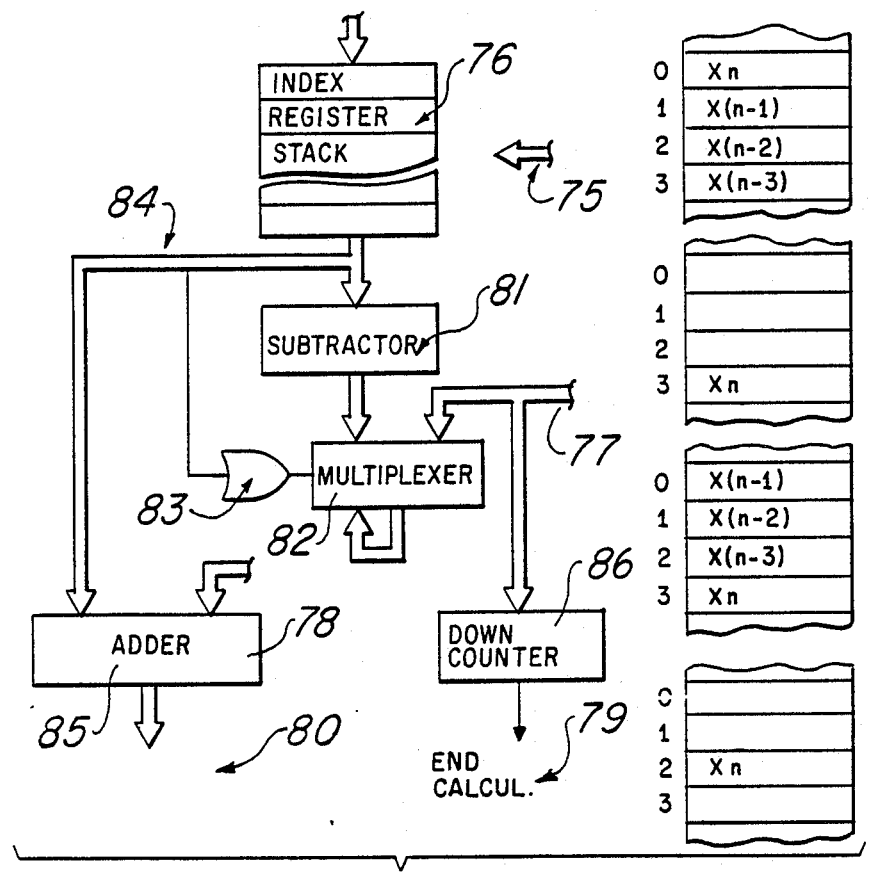
FIG. 9 is a detailed block diagram of the address processor of the device of FIG. 5.

Address processor (54) will now be described in reference to FIG. 9.

The role of the address processor is to manage a storage area whose size depends on the number of coefficients of the filter to calculate, in a circular buffer.

Two data and coefficient memories (52, 53) may have their own address processor.

Address processor (54) receives from CROM (49):

index register address (75) which selects one of 16 four-bit registers from stack (76);

number (77) of calculation cycles to be carried out corresponding to the number of coefficients of the filter;

and base address (78) of the storage area used for the data or coefficients.

The address processor generates:

end of calculation EOC signal (79)

an address (80) for accessing data memory (52) or coefficient memory (53).

Address processor (54) comprises index register stack (76), four-bit subtracter (81), connected to register stack (76) and useful for selecting either the output of subtracter (81) or the number of cycles (77) under the control of logic circuit (83) which detects the zero value on bus (84) connecting register stack (76) to adder (85), and downcounter (86) which manages end of calculation EOC (79) signal.

Address processor (54) functions in the following manner.

It is assumed that the address processor generates an address sequence for a four-coefficient FIR filter like the one depicted in FIG. 7.

For example, the following configuration is selected.

Index register is selected at address 0. The four bits of field (75) are at zero.

There are four coefficients in the filter to be calculated, and bit field (77) is equal to 00 11.

Base address (78) is 1000 or >8 in hexadecimal values.

When the circuit is initialized, the index register at address "0" of stack (76) was loaded with value 3.

At the beginning of the calculation cycle, downcounter (86) is loaded with the value of number (77) of cycles to be executed from CROM (49) (FIG. 5).

The contents of the index register selected are placed on bus (84) and generate, with base address (78) coming from CROM (49), first address (80) which accesses data memory (52) or coefficient memory (53), via adder (85).

The reading address is $$\begin{aligned} A &= 1000 \\ + I &= \underline{0011} \\ & \phantom{=} 1011 \end{aligned}$$

Depending on the process described above, the data item located at this address is placed in register (57) of the CPU and for the coefficient whose address is generated by an identical system (not shown) in register (59) (FIG. 6)

During the memory access, the value of the index is processed by address processor (54).

$I = m, = I - 1$, value 2 obtained at the output of subtracter (81) is reloaded in index register.

Downcounter (86) is decremented.

During this cycle, the address processor has generated the addresses for accessing sample $xn - 3$ and coefficient h3.

During the two next cycles the index is equal to 2, then to 1, and is useful for accessing samples $xn-2$ and $xn-2$ to multiply them by coefficients h2 and h1.

At fourth cycle $I = 0$, the downcounter is also at zero. It generates the EOC signal which will stop the calculation sequence and allows the next microcode to transfer result Yn into data memory (52).

During the last access to sample xn, test logic (83) detects a zero status on bus (84) and generates a control signal from multiplexer (82), which allows the value of the number of cycles (77) to be reloaded into the corresponding index register of stack (76) rather than that leaving subtracter (81).

At the end of the calculation, the contents of the index register are equal to 3.

Generally, an overall filtering function is performed in several stages as shown in FIG. 3.

For example, sample xn of filter R (27) comes from the result of calculating GR (29).

At the end of the calculation, GR will place its result which will become the next sample xn for the next calculation.

Since $xn-3$ is the oldest sample, new sample xn takes its place in memory and $xn-2$ becomes $xn-3$, $xn-2$ becomes $xn-2$, etc.

As just observed, the calculation ends with $1 = 3$. The index is therefore properly positioned for the phase in which sample xn is written in the storage area. During this transfer, I is decremented and points to position 2 which corresponds to sample $xn-3$ for the next calculation.

We therefore see that there is first a recirculation of the index from value 3 to 0, then a sliding of the address of xn which allows the sample stack to be automatically managed.

Figure 10:
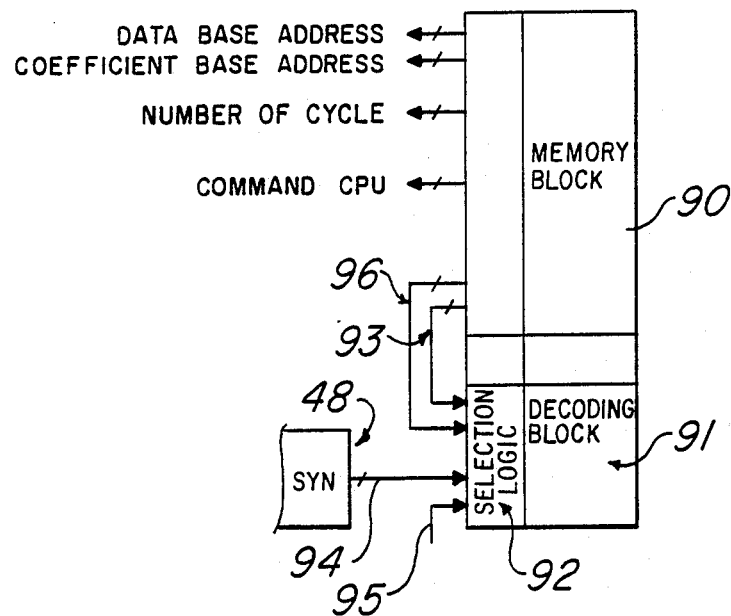
FIG. 10 is a block diagram of the CROM memory incorporated in the design of the digital signal processor of FIG. 5.

CROM (49) memory generates all control signals of CPU (51) and of address processor (54). It also generates signals for executing a sequence of microcodes for implementing a calculation sequence, for example, followed by a result transfer FIG. 10 shows the diagram of CROM (49) which includes memory block of 48 microcodes to 48 bits (90), decoding block (91) for selecting one of the microcodes, selection logic (92) for selecting the next microcode to be executed as a function of selection signals (93).

Logic (92) is connected to synchronizer (48) (FIG. 5) via channel (94). It also has flap signal input (95) and address input (96) by which it is connected to memory block (90).

A microcode sequence is carried out in the following manner.

The field of a microcode is shown below.

| Mx | | A | | | | | | CPU | Processor Ad |
|----|---|---|---|---|---|---|---|-----|--------------|
| 1  | 0 | 5 | 4 | 3 | 2 | 1 | 0 |     |              |

This microcode field includes the control bits of address processors (54), the control bits of CPU (51) and two address fields reserved for sequencing the microcodes.

When $Mx\,1-0$ is equal to zero, addresses E5 to E0 are used for selecting the next microcode.

When $Mx\,1-0=1$, the microcode is selected by inputs E5 to E0 and by the EOC signal which allows $E_5E_4E_3E_2E_1\,0$ to be selected if EOC=0, or $E_5E_4E_1\,1$ if EOC=1.

Accordingly, depending on the EOC signal coming from address processor (54), a calculation sequence which ends with EOC can generate a result transfer cycle using another microcode.

When $Mx\,1-0=2$, the two low-order bits E0 and E1 are replaced by A0 and A1 coming from CROM 49.

Finally, when $Mx\,1-0=3$, six output bits A5 to A0 of CROM select the address of the next microcode to be executed It is assumed that we want to execute the calculation sequence on four coefficients and then save the result.

When the system is in wait status, the input point is at zero. Signals $Mx\,1-0=0$ mean that for each cycle, the microcode selected is at address "000000". This microcode does not perform operations in CPU (51) and in address processor (54).

| | Mx | | A | | | | | | | | |
|--|----|---|---|---|---|---|---|---|---|---|---|
| 000000 | 0 | 0 | 0 | 0 | 0 | 0 | 0 | 0 | NOP | NOP |
| EOC* | | | | | | | | | | |

| | | | | | | | | | | Address |
|--|--|--|--|--|--|--|--|--|--|---------|
| 00100 | 0 | 0 | 1 | X | X | X | X | X | X | CALCUL | Address |
| 00100 | 1 | 1 | 1 | 0 | 0 | 0 | 0 | 0 | 0 | TRANSF. | |
| 001010 | | | | | | | | | | | |

When synchronizer (48) requests a calculation sequence, it generates the address of the first microcode which contains the bits permitting the management of CPU (51) and address processor (54).

$Mx\,1-0+1$. Least significant bit LSB of the input point is replaced by the EOC* signal.

As long as EOC* is equal to zero, the calculation continues and the samples are read out of store, then processed according to the process described above.

At the end of the calculation, EOC*=1 selects the microcode located at the next address of the input point. It contains the codes used for controlling the transfer of the calculation result to the selected address Mx=3 makes it possible to return to address "000000" and wait for the next calculation.

The sequencing of the filtering operations and how to use the architecture according to the invention to increase its calculation capacity and allow several subscriber channels to be processed will now be described.

At the inputs and outputs of the telephone exchange, the data appear in the form of samples of 8 bits each with a rate of 8 kHz.

Figure 11:
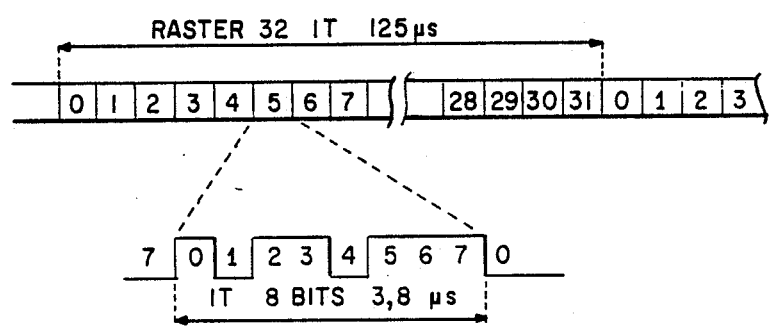
FIG. 11 is an illustration of a raster of thirty two time intervals and shows in detail the contents of a time interval.

As shown in FIG. 11, each sample forms time interval TI. Since the bit rate is 2.048 MHz, the interval lasts 3.9 $\mu$s. A raster contains 32 TI and lasts 125 $\mu$s (8 kHz). Each time interval (TI) corresponds to a sample for a subscriber.

When digital signal processor DSP receives a raster, it should know the position of interval TI to be processed and then perform the filtering function to generate an analog signal.

Similarly, the analog signals received are converted into digital signals, then processed by DSP to be restored in the outgoing raster at interval position TI defined by the exchange.

The digital samples exchanged with the exchange corresponding to connections NE and NS of FIG. 3 have a repetition rate of 8 kHz, or once per raster.

On the line side, the samples are exchanged on terminals AE and AS at a rate of 32 kHz to be processed by decimation filters for AE and interpolation filters for AS.

Terminal AE (22) is connected to a digital-analog converter, and terminal AS is connected to analog-digital converter.

In the filtering sequence of NE to AS, filter OP (26) functions at 8 kHz, i.e., there is only one calculation in a raster (FIG. 11).

Filters GR (29), R (27) and B (36) function at 16 kHz, so that there are two calculations per raster, and filter I (28) functions at 8 kHz.

In the filtering sequence of AE to NS, filter Z (37) functions at 32 kHz, filters D, X, and GX (34, 30, and 31) function at 16 kHz, and Filter BP functions at 8 kHz.

Compared to the position of samples NS or NE in a raster, there are therefore calculations at 8, 16, and 32 kHz which should be divided in the raster.

We will now examine how to divide the calculations in a raster as a function of the rates and filters.

Table 2 below shows how the different filter calculations are combined as a function of the rates and calculation times as a function of the number of coefficients.

The calculations for the filter shown in FIG. 3 are combined in six categories.

| 1. LP | Rate 8 kHz, duration 1140 ns |
|-------|------------------------------|
| 2. GR + R | Rate 16 kHz, duration 720 ns |
| 3. I + Z + $\Sigma$ | Rate 32 kHz, duration 720 ns |

-continued

| | | |
|---|---|---|
| 4. B + D + Σ | Rate 16 kHz, duration 960 ns | |
| 5. X + 6x | Rate 16 kHz, duration 660 ns | |
| 6. BP | Rate 8 kHz, duration 1320 ns | |

TABLE 2

| 8 KHz | LP | | | | | | | BP |
|---|---|---|---|---|---|---|---|---|
| 16 KHz | | 6R | R | | B + D + Σ | X | 6X | |
| 32 KHz | | | | I + Z + Σ | | | | |
| Nb coeff | 13 | | 4 | 5 + 4 | 8 + 5 | 4 | | 18 |
| Nb μCodes | 4 | 2 | 3 | 3 | 3 | 2 | 2 | 4 |
| Nb Cycles | 19 | 4 | 8 | 12 | 16 | 7 | 4 | 22 |
| Time (ns) | 1140 | 240 | 480 | 720 | 960 | 420 | 240 | 1320 |
| | 1 | 2 | | 3 | 4 | 5 | | 6 |
| | | | The duration of a cycle is TC = 60 ns | | | | | |

As shown in FIG. 12, when the sample of time interval TI5 is received for processing, the request for calculating at 8 kHz triggers a calculation or sequence corresponding to filters (1-6) of Table 2 above. This calculation lasts 5520 ns. After a quarter of a raster, i.e., 31.25 s, calculation (3) performs the filtering at 32 kHz. Likewise, at mid-raster, i.e., after 62.5 s, calculations 2 to 5 are performed for filtering 16 kHz and finally a calculation at 32 kHz while sequence 3 remains at 93.75.

We therefore see that the calculations corresponding to a sample or time interval TI are distributed in time to positions corresponding to the filtering rates.

We also see that the calculation time for a subscriber also uses part of the calculation capacity of the CPU, i.e., 10.2 μs every 125 μs.

There is therefore a calculation capacity corresponding to 125/10.2 = 12 subscribers with the machine cycle times allowed by current integration technology.

We will therefore see how the calculation capacity is shared by several subscribers knowing that certain calculations are more critical owing to the short feedback time required by a proper operation of the system.

We see in FIG. 3 that two filters 2 and B (37) and (36) connect the receiving and transmission branches.

The loop containing filter Z is determining, since it is used to adapt the line impedance. Its feedback time should be short to prevent oscillations.

The same is true for filter B which is the balance between the transmission and reception. If its feedback time is too long, there are risks of echoing.

The calculations of filters Z and B are therefore given priority, and the corresponding calculation request should possibly interrupt an excessively long calculation sequence.

An example of a calculation sequence will now be described in reference to FIG. 13.

When sample (1) is present, calculation request R1 corresponding to a filtering at 9 kHz is generated by sequencer (47) (FIG. 5).

There is no calculation in progress; therefore, calculation cycle 1-6 is triggered.

Sample 2 is introduced after time interval TI of 3.9 μs.

Since the previous calculation is not completed, calculation request R2 cannot be executed immediately with the same priority level since R1 is anterior.

When sample (7) arrives, no calculation is in progress. Request R3 at 9 kHz is executed immediately.

When sample (8) corresponding to the fourth channel to be processed and to one-fourth of raster (32) TI appears, two calculation requests appear at the same instant:

a calculation request at 32 kHz of line 1 and new request R4 at 9 kHz.

Since the calculation at 32 kHz takes priority, request R1 interrupts the calculation of line (3) at the end of the calculation corresponding to filtering (5), i.e., 4000 ns after the appearance of sample (7).

When the calculation of line (1) is completed, that of line (3) continues since request R4 at 9 kHz is posterior.

The same applies to the next sample: the calculation cycle of line (4) is interrupted by calculating 32 kHz of line (2).

The priority rule is the following.

The priority orders as a function of the calculation rates are:

(1) Calculation at 32 kHz (3)
(2) Calculation at 16 kHz (2-5)
(3) Calculation at 8 kHz (1-6)

When two requests or more, of equal priority, are in conflict, the oldest request has priority.

When a calculation should be interrupted, this can only take place at the end of a full sequence 1, 2, 3, 4, or 5.

The position of time intervals TI1-TI4 is determined by the telephone exchange via a management system (not shown).

Sequencer (47) (FIG. 5) which receives these signals TI1 to TI4 and clock signals at 2 MHz of the exchange has the role of generating calculation requests for each filtering rate. The requests are correlated in time to the duration of a raster as shown in FIGS. 12 and 13.

Figure 14:
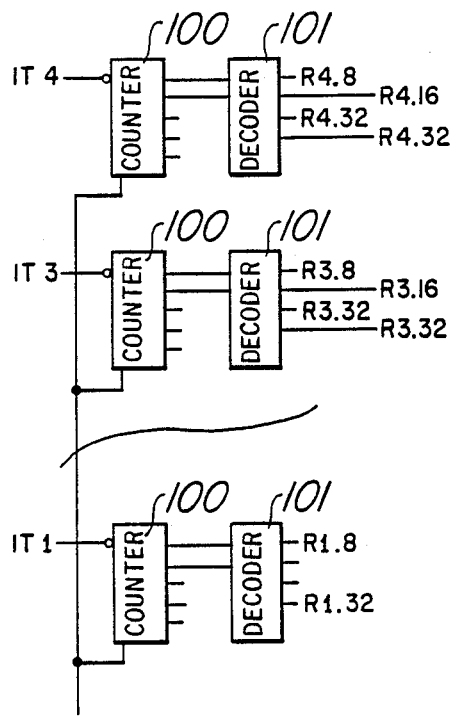
FIG. 14 is a partial block diagram of the sequencer which is part of the device of FIG. 5.

The requests corresponding to a subscriber are generated by counter (100) and decoder (101) which are part of sequencer (47) shown in FIG. 14. Decoder (101) is initialized by corresponding signal TI. It divides each request into its elements at 8, 16, and 32 kHz.

After requests R4 to R1 are divided into their elements by sequencer (47), they are transmitted to synchronizer (48) which records them, managing their priorities and queuing the low priority calculations.

Figure 15:
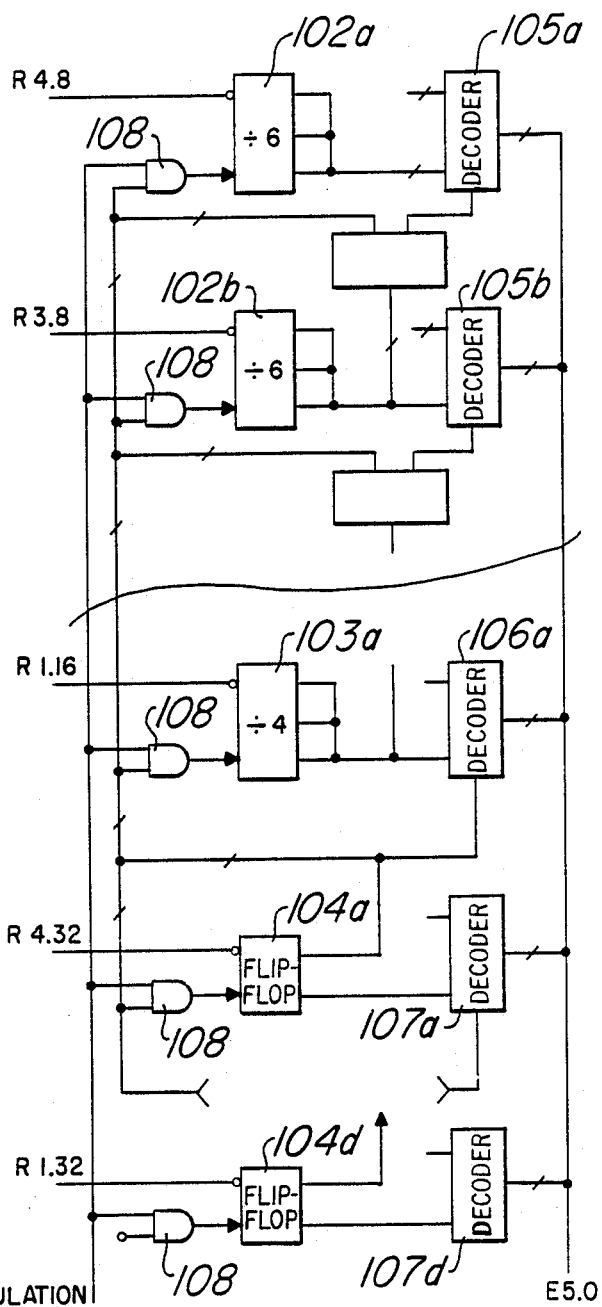
FIG. 15 is a block diagram of the synchronizer belonging to the device of FIG. 5.

As we can see in the diagram of FIG. 15, requests R4.8–R1.8 each initialize a divider by six (102a–102d) for generating the input points of CROM (49) (FIG. 5) corresponding to calculations 1-6.

Requests R4.16–R1.16 each initialize a divider by four (103a–103d) which makes it possible to generate the input points of CROM (49) corresponding to calculations 2-5.

Requests R4.32 to R1.32 each initialize a respective flip-flop (104a–104d) for calculations at 3 to 32 kHz.

On the same diagram of FIG. 15, the highest-priority channel is channel R1.32 and the lowest-priority channel is channel R4.8. This priority is established as indicated above, by the rate of the calculation to be performed and by the chronology in which the samples appear.

It is assumed that a request is recorded by flip-flop (104d). Signal (52) coming from the output of flip-flop (104d) other than that connected to decoder (107d) will be applied to flip-flops (104a–104c) and to dividers (102a and 103a–103d) via gates (108) with two inputs which receive at their other inputs end of calculation EOC signal coming from address processor (54) and prevents the low-priority channels from operating and inhibits decoders (105a–105d), (106a–106d) and (107a–107d), associated with the different dividers, except for that decoder (107d) of the channel selected which generates its code at the input of CROM (49).

When end of calculation EOC signal in progress is generated by address processor (54), the code of CROM (49) is handled and calculation (3) of channel R1.32 is executed Flip-flop (104d) is returned to its neutral state.

If during this period one of the lower priority channels was in operation, for example channel R4.8, the generation of the CROM input points of this channel stops after calculation (2) to insert calculation (3) of the priority channel as shown in FIG. 13.

During the execution of a channel, it is the EOC signal which advances the calculation address counter.

In all decoders (105a–107d), there are three bits to determine the number of the calculation to be performed and three bits to select the number of the channel under consideration.

The device just described makes it possible to perform the calculations of several filters during the span of a raster of several time intervals, provided that the requests for channels of the various subscribers do not reach the device during different time intervals TI.

Conversely, problems appear if several requests for channels take place in the same time interval TI.

It is assumed that the device is to process eight channels, for example, and that in the worst case, the requests for channels 1–8 take place in the same TI position.

Figure 16A:
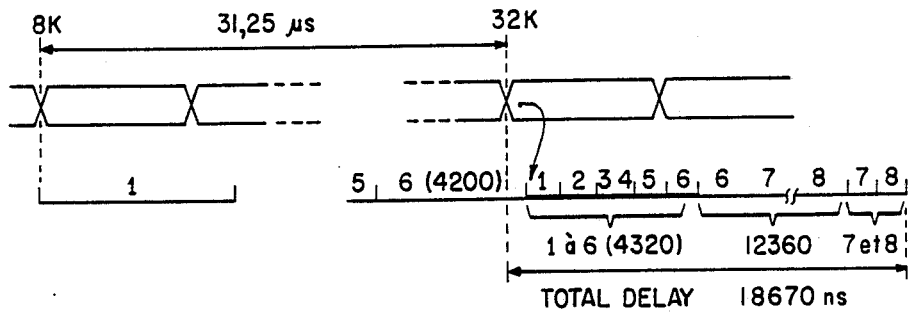
FIGS. 16a to 16c are timing diagrams representing the effect of the position of time intervals TI on the propagation time of the group of digital filters.
Figure 16B:
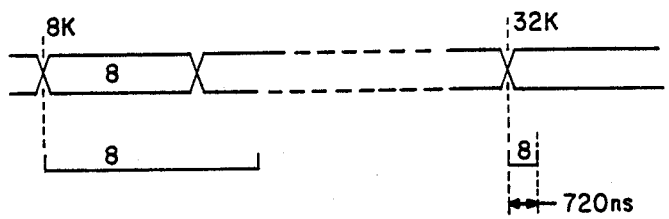

As we can see in FIG. 16a, these requests for channels (1–8) appear on the TI interval so that the calculation of the filters associated with these eight channels is triggered on the 8-kHz signal.

After a quarter of a raster, i.e., 31.25 μs, the request for a high-priority calculation at 32 kHz of the first channel arrives, whereas the calculation of the sixth channel, which starts at 27600 ns and ends at 33120 ns is in progress.

It is interrupted at the end of the filter calculation, i.e., after 4200 ns.

The calculations of channels 1 to 6 are therefore inserted and the calculations at 8 kHz can continue Finally, the two last calculations at 32 kHz are performed.

There is therefore a 18670-ns delay to end the calculation of channel 8 relative to the request.

It is assumed, however, that all the subscribers hang up, except that of channel 8.

There is no delay caused by channels 1–7 of the calculation at 8 kHz and the calculation of channel 8 at 32 kHz is performed immediately.

The position of the calculation of channel 9 may therefore vary between 18670 ns and 720 ns.

Figure 16C:
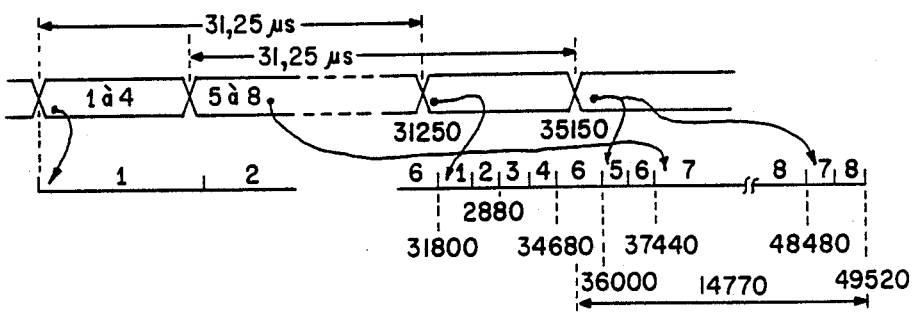

As shown in FIG. 16c in the case of an organization in which only four time intervals TI may occur at the same instant, if eight requests occur on two consecutive time intervals the total delay of the last calculation at 32 kHz becomes 14770 ns, and if channels 1–7 hang up, it is 720 ns.

Figure 17:
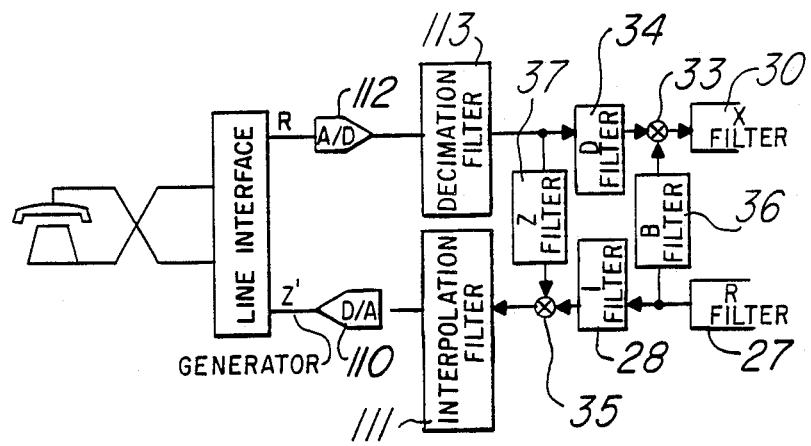
FIG. 17 is a diagram showing the link of a subscriber line with a digital signal-processing device creating a corresponding filtering function.

As shown in FIG. 17, each subscriber line has impedance Z of the order of 600 Ω, whereas the part with digital-analog converter (110) and interpolation filter (111) has generator output impedance Z′.

The voltage measured on terminal R of the line interface and converted into a digital value by analog-digital converter (112) therefore depends on the impedance ratio, and there is a return of the signal injected into the line on the measured signal.

The balance or anti-echo filter 113 makes it feasible to take part of the signal transmitted to the line and subtract it by adder BD (33) from the signal received in the impedance ratio $Z/Z+Z'$, with a delay corresponding to the loop.

Filter Z (37) makes it possible to synthesize the line impedance so that generator output Z′ is adapted to line impedance Z.

In the relative cases of introducing eight channels on same time interval TI or four time intervals at the same time described above, the total delay is always shorter than a clock period of 32 kHz.

Since the calculation results are considered in the next raster cycle, there is no problem of a group delay.

Conversely, the management of the calculation position as a function of that of time interval TI leads to a complex logic, due to the fact that the calculations can be interrupted.

In order to correct this drawback, in the management of time interval TI rasters, which is carried out by a concentrator, a three-phase method is applied:

Capturing the samples in raster N,

Calculating the filtering in the next raster N+1, and

Restoring the samples in raster N+2.

The main advantage of this technique is that the calculations are performed at predetermined positions and make it possible to optimize the calculation time and be independent with respect to the sample position.

On the other hand, the delay between the capturing of a sample, the position of which is defined by the number of time interval TI and its readout in another number may vary with the respective positions of the samples between 129 μs and 367 μs.

With a more complex management of the input and output registers, it is possible to reduce this time to 250 μs.

Figure 18:
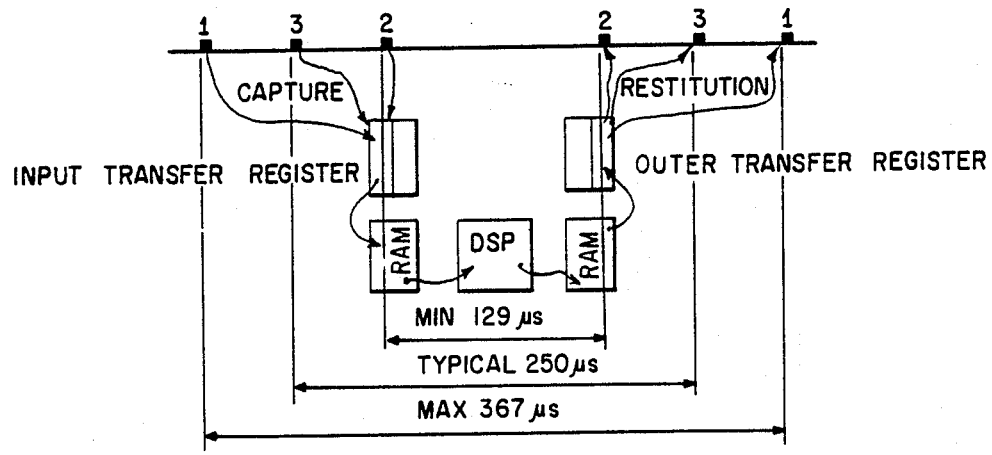
FIG. 18 is a diagram of the technique of delaying the calculation in terms of the sample acquisition used in another embodiment of the invention.

The diagram of FIG. 18 shows the features offered by the aforementioned technique and used for implementing the device according to the invention. Below we shall see input and output register stacks connected to the terminals of the portion of the device used for creating the filtering functions.

In order to examine the management of the input and output register stacks, a calculation process to be adopted should be determined.

The general diagram of the digital signal-processing device is the same as that described in reference to FIG. 5.

Figure 19:
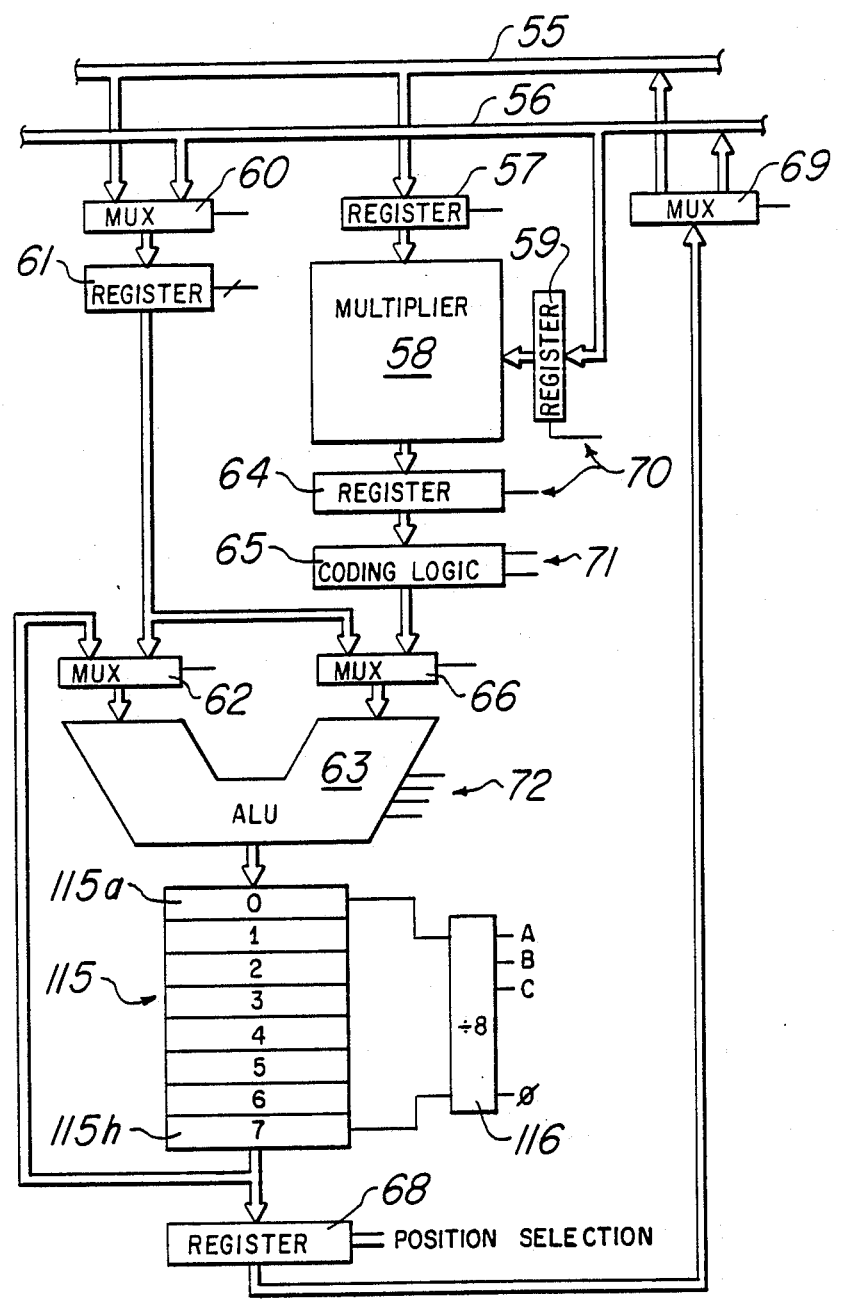
FIG. 19 is a block diagram of the CPU in another embodiment of the processing device according to the invention.

This device has a central processing unit shown in FIG. 19. This CPU is similar to that described in reference to FIG. 6, but rather than a single accumulator (67) associated with the arithmetic and logic unit, it has as many accumulators (115) as there are channels to be processed, i.e., eight in the present example.

The operation of the digital signal-processing device comprising the central processing unit in FIG. 19 is the same as that of the device of FIG. 3, but in this case, each operation that takes place during the calculation of a filter is repeated eight times.

Address processor (54) (FIG. 3) reads out from data memory (52) eight consecutive samples and from coefficient memory (53) eight coefficients, if they are not identical.

The samples are multiplied in turns by the coefficients, and the results are placed in eight accumulators (115a-115h) at the output of arithmetic and logic unit (63).

At the end of the calculation of eight filters, the results are stored in data memory (52).

Accumulator stack (115) is connected to an eight divider (116) initialized by the beginning of the delivered calculation of addresses A, B, and C, thus making it possible to successively validate the eight accesses during the calculations.

Figure 20:
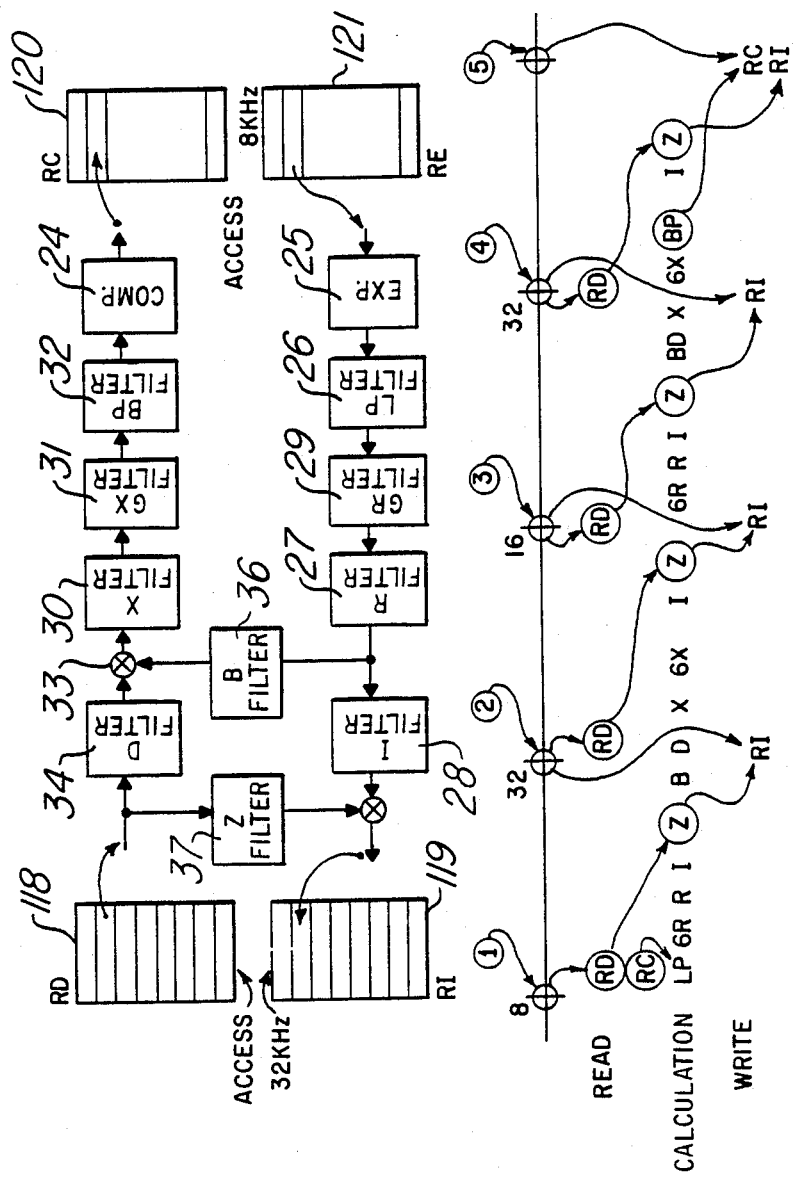
FIG. 20 illustrates a filter calculated by the CPU of FIG. 19. There are stacks of as many registers associated with said terminals as there are channels to process.

As shown in FIG. 20, each terminal of the quadripole formed by the filtering block shown in FIG. 3 is connected to a stack of eight registers RD (118), RI (119), RC (120), and RAE (121) in which the samples corresponding to the filtering calculation rate is 8 kHz by registers RC and RE and 32 kHz by registers RD and RI.

Compressed samples E are read in stack RE (121) to calculate filters LP, GR, R, and I.

At instant 1, the samples of stack RD are read to calculate line impedance Z.

The result is placed in stack RI to be used in the next 32-kHz cycle, then the calculation continues with BP, X, and GX.

For the other instants 2, 3, 4, and 5 of the raster, the principle is the same. For each 32-kHz period, the RD samples are processed and restored in the next cycle.

The RE samples connected at the beginning of the raster are restored in stack RC (120) at the end of the raster.

Filter LP is a low-pass filter with 13 coefficients operating at 8 kHz (IIR).

As already indicated above, filter IIR is defined by the relationships:

$$d(n)=x(n)+a1d(n-1)+a2d(n-2)+\cdots a6d(n-6)$$

$$y(n)=b0dn+b1d(n-1)+b2d(n-2)\cdots b6d(n-6)$$

The first operation of the calculation of d(n) consists of transferring the samples received in stack RE (121) to accumulator (115) at the corresponding positions.

In order to keep the same cycle in the calculation of d(n), x(n) is multiplied by a0=1 which does not exist in the filter relationships.

The same cycle is chained for the calculations with coefficients a1 to a6 coming from coefficient memory (53) (FIG. 5) which are multiplied by the results of the calculations of d(n) of the preceding cycles: d(n−1) to d(n−6).

At the end of the calculation, the d(n) values for channels 0-7 are available in all accumulators 115a-115h.

To transfer the dn values into data memory (52), eight extra cycles are needed.

The write addresses are generated by address processor (54).

To calculate d(n):

8 cycles are necessary to transfer RE0-RE7 in accumulator (115);

8 cycles per coefficient, i.e., 6×8 cycles;

2 cycles due to the pipeline;

8 cycles to transfer the contents of accumulators (115a-115h) into data RAM memory (52).

For the second part of this filter calculation, y(n) must be calculated with the d(n) values multiplied by the corresponding coefficients.

The number of cycles needed for this second part is 66 for eight channels.

Consequently, to calculate yn on eight channels, it is necessary for:

$$66\times 2=132 \text{ cycles.}$$

Since the duration of a calculation cycle is 60 ns, the time needed to perform a complete calculation is:

$$60\times 132=7920 \text{ ns.}$$

In the case described in reference to FIGS. 1–15 in which the calculation is performed independently by channels, the total calculation time is 1140×8=9120 ns.

For the other calculations, the pipeline principle is equivalent except for filters IZ and BD which are grouped so that the additions of the results I1Z and BD are done directly without first accessing the data memory.

In the following table, the filter calculation time is given for eight channels simultaneously.

| Table with 8 channels | | | | | | | | | | | |
|---|---|---|---|---|---|---|---|---|---|---|---|
| 8 KHz | RE | LP | | | | | | | | BP | RC |
| 16 KHz | | | GR | R | | | BD | X | 6X | | |
| 32 KHz | | | | | RD | I/Z | RI | | | | |
| coeff. | | 13 | | 4 | | 5 + 4 | | 8 + 5 | 4 | | 18 |
| μcode | 1 | 4 | 2 | 2 | 1 | 3 | 1 | 3 | 2 | 2 | 4 | 1 |
| nb. cycles | 0 | 132 | 18 | 42 | 8 | 82 | 0 | 114 | 42 | 18 | 164 | 0 |
| Temps | | 7920 | 1080 | 2520 | 480 | 4920 | | 6840 | 2520 | 1080 | 9840 | |

The access to register RE (121) (FIG. 20) takes place during the calculation of LP.

The transfer of RI takes place at the end of the calculation of Z rather than transferring it into the data memory.

The transfer into register RC (120) takes place at the end of the calculation of BP.

The calculation resource used is the following.

60 $ns[x$(number of cycles $RE+LP+BP+RC)+2x$-(number of cycles $GR+R+BD+X+BX)+4X$(number of cycles $RD+I/Z+RI)]=67440$ μs.

This duration constitutes 54% of the capabilities of central processing unit CPU.

If the same process were used for sixteen channels rather than eight, the calculation time would be 129.12 μs.

A clock with a time cycle of 58 ns allows sixteen 125-μs channels to be processed, i.e., in the time interval of a raster.

The sequence of the calculation operations of the various stages of a filter is given in the following table.

circuit (127) is placed between bus (125) and register stack RE (121).

Register stacks (118, 119) are respectively connected to decimation and interpolation circuits (113, 111) (FIG. 17), whereas register stacks (120, 121) are respectively connected to output TX and to input RX.

Moreover, the buses linking multiplexers (124) and (123) are connected to multiplier (58), to data memory (52), to coefficient memory (53) and via multiplexer (60) to the inputs of ALU (63).

|  | FILTER | OPERATION |  | SOURCE 1 | SOURCE 2 | DEST. | No CYCLES |
|---|---|---|---|---|---|---|---|
| Entry point | LP | 1 | MAC | RE | COEFF 1 | ACCU | 8 |
|  |  | 2 | MAC Pipeline | DATA LP | COEFF LP | ACCU | 48 2 |
|  |  | 3 | Transf. | ACCU |  | DATA LP | 8 |
|  |  | 4 | MAC | DATA LP | COEFF LP | ACCU | 56 |
|  |  | 5 | Pipeline Transf. | ACCU |  | DATA GR | 2 8 |
| Entry point | GR | 1 | MAC | DATA GR | COEFF GR | ACCU | 8 |
|  |  | 2 | Pipeline Transf. | ACCU |  | DATA R | 2 8 |
|  | R | 1 | MAC | DATA R | COEFF R | ACCU | 32 |
|  |  | 2 | Pipeline Transf. | ACCU |  | DATA I | 2 8 |
|  |  | 3 | Transf. | ACCU |  | DATA B | 8 |
| Entry point | ZI | 1 | Transf. | RD |  | DATA Z | 8 |
|  |  | 2 | Transf. | RD |  | DATA D | 8 |
|  |  | 3 | MAC | DATA Z | COEFF Z | ACCU | 32 |
|  |  | 4 | MAC Pipeline | DATA I | COEFF I | ACCU | 40 2 |
| End of sequence | BD | 5 | Transf. | ACCU |  | RI | 8 |
|  |  | 1 | MAC | DATA D | COEFF D | ACCU | 40 |
|  |  | 2 | MAC | DATA B | COEFF B | ACCU | 64 |
|  |  | 3 | Pipeline Transf. | ACCU |  | DATA X | 2 8 |
|  | X | 1 | MAC | DATA X | COEFF X | ACCU | 32 |
|  |  | 2 | Pipeline Transf. | ACCU |  | DATA GX | 2 8 |
|  | GX | 1 | MAC | DATA GX | COEFF GX | ACCU | 8 |
|  |  | 2 | Pipeline Transf. | ACCU |  | DATA BP | 2 8 |
|  | BP | 1 | MAC | DATA BP | COEFF BP | ACCU | 72 |
|  |  | 2 | Pipeline Transf. | ACCU |  | DATA BP | 2 8 |
|  |  | 3 | MAC | DATA BP | COEFF BP | ACCU | 72 |
|  |  | 4 | Pipeline Transf. | ACCU |  | RC | 2 8 |

Figure 21:
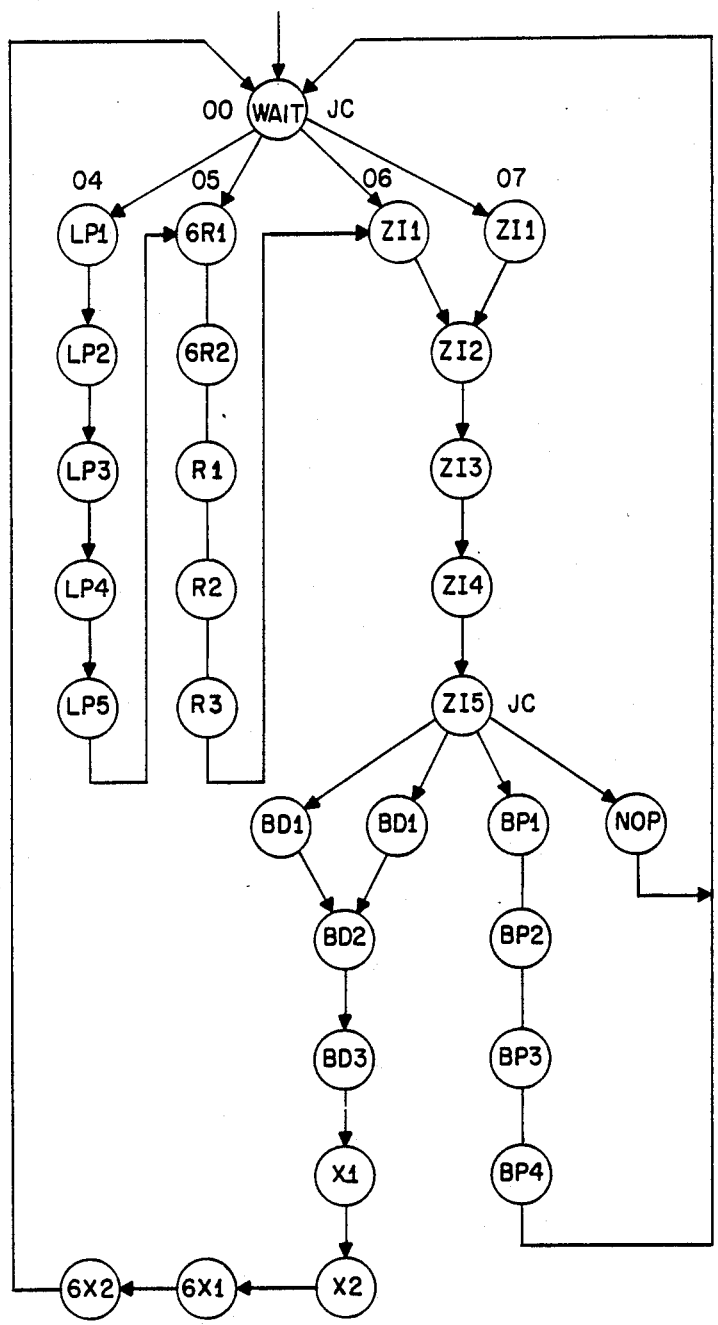
FIG. 21 shows an algorithm for calculating the various filter components by the device according to the invention in which the technique of calculating several filter simultaneously is applied.

The sequence of the calculation operations given in the aforementioned table is shown in FIG. 21.

Figure 22:
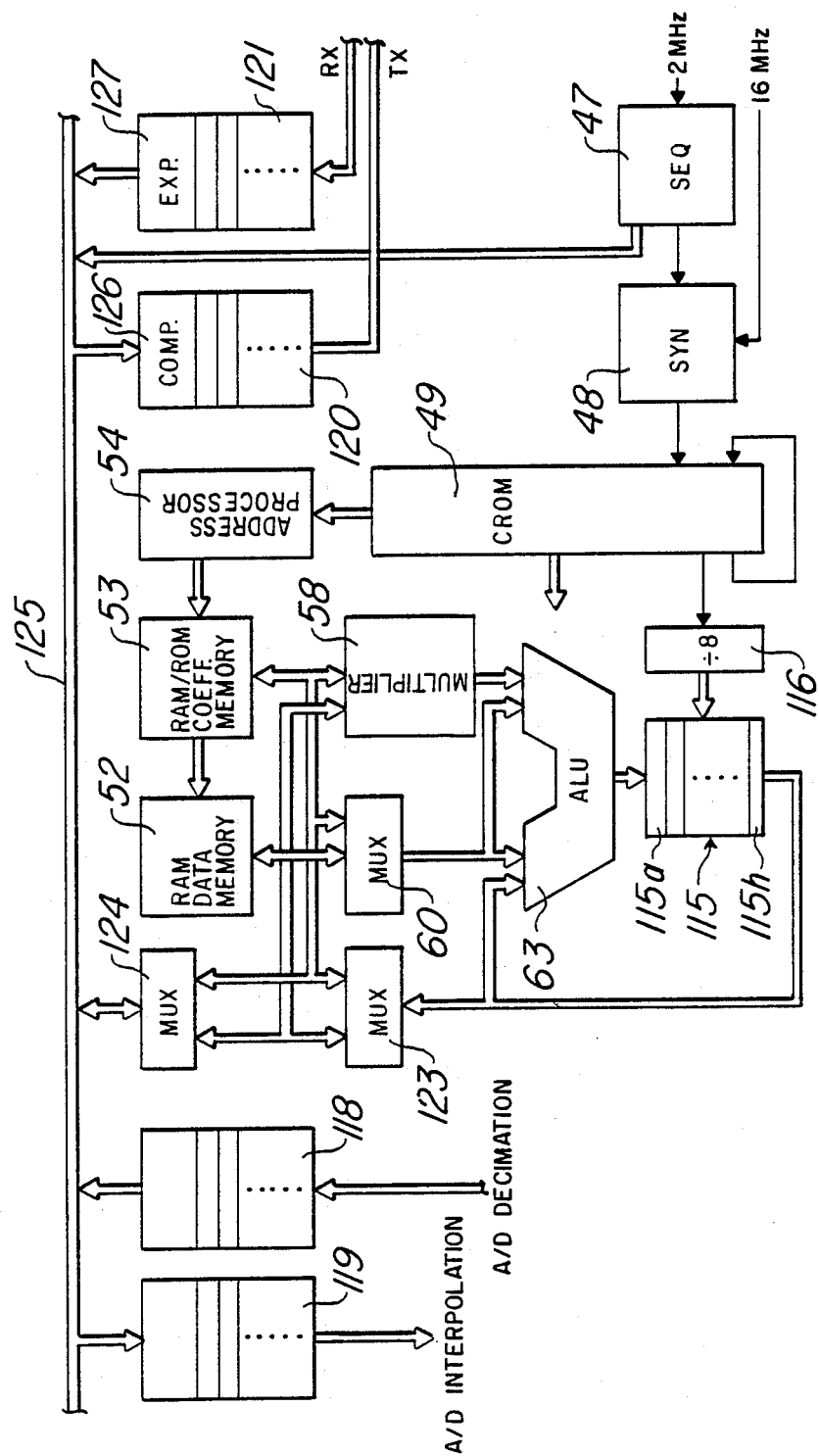
FIG. 22 is a diagram showing the circuit of a digital signal-processing device designed for the simultaneous calculation of eight channels.

A digital signal-processing device used for the simultaneous calculation of the values of the eight channel filters is shown in FIG. 22.

It has a central processing unit CPU similar to that of FIG. 6.

The components of this CPU which are identical to those of the CPU of FIG. 6 are designated by the same reference numbers.

In contrast to the circuit of FIG. 6, the CPU of the circuit of FIG. 22 has at the output of ALU (63) a stack of accumulators 0–7 (115–115h) controlled by an 8 divider (116) from CROM 49 as described in reference to FIG. 19.

The output of accumulator stack (115a–115h) is directly connected to the first input of ALU (63) and by two multiplexers (123, 124) to bus (125) that links with register stacks RI and RD (119, 118) and with register stacks RC and RE (120, 121).

Signal compressor circuit (126) is placed between bus (125) and register stack (120), whereas signal expander The digital signal-processing device performs the calculations of the filters for eight channels, exchanges the data between the exchange and the line via buffer registers RC and RE (120, 121), on the side of the exchange and buffer registers RI, RD (119, 118) on the line side.

On the central side, the exchanges take place at the raster rate at time To.

On the line side, the exchanges take place at 32 kHz, i.e., four times per raster.

Figure 23:
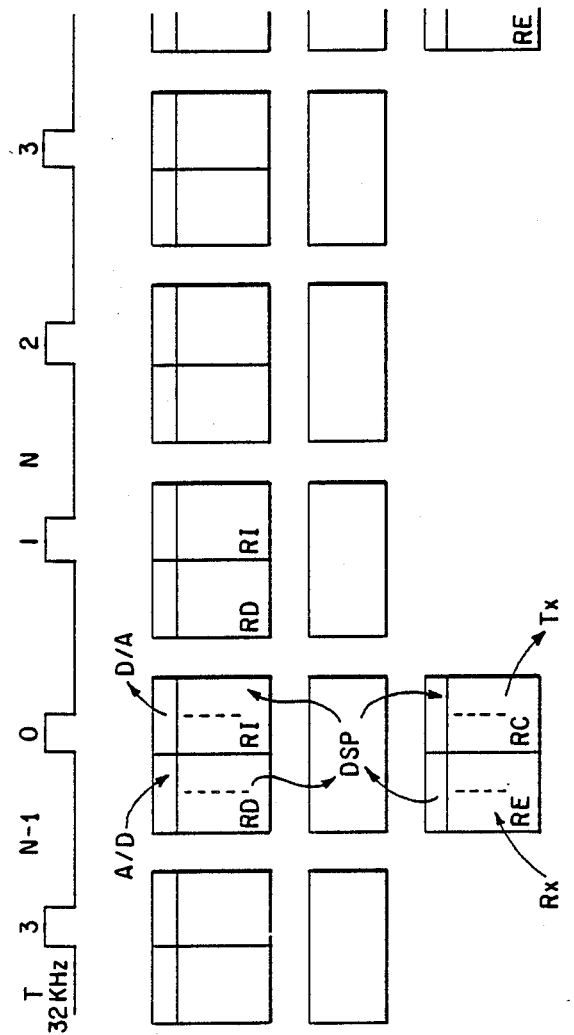
FIG. 23 is a diagram showing the exchanges of the samples to be processed between the lines and the telephone exchange.

This is shown in FIG. 23, at instants To, the eight samples which are to be processed in raster N are loaded into register stack RE (121). The eight samples which were processed during raster N−1, then loaded into register stack RC (120) are ready to be restored to the exchange on line TX.

At instants T0, T1, T2, and T3, the eight exchanges coming from the line which were converted into digital values, then decimated by the analog-digital converter (112) and decimation filter (113) (FIG. 17), are loaded into register stack RD (118). These samples are processed in a 32-kHz period then restored at the end of the period in register stack RI (119) to be filtered by interpolation filter (111), then converted into analog by digital-analog converter (110).

The mechanism for accessing the register stacks by the outside channels is not described here.

In the following description, we will examine how the digital signal-processing device accesses these register stacks to acquire the samples, process them, and restore them.

Filtering sequences T0, T1, T2 and T3 in which registers RD and RI (118, 119) are accessed each time, time interval T0 in which register RE (121) is accessed, and time interval T3 for accessing stack RC (120) are generated by sequencer (47) which transmits a calculation request to synchronizer (48).

Synchronizer (48) generates an input point corresponding to the first microcode of the calculation algorithm, and digital signal-processing device DSP performs the calculation under the control of CROM memory (49).

When the corresponding calculation is completed, synchronizer (48) is repositioned in the wait status.

Figure 24:
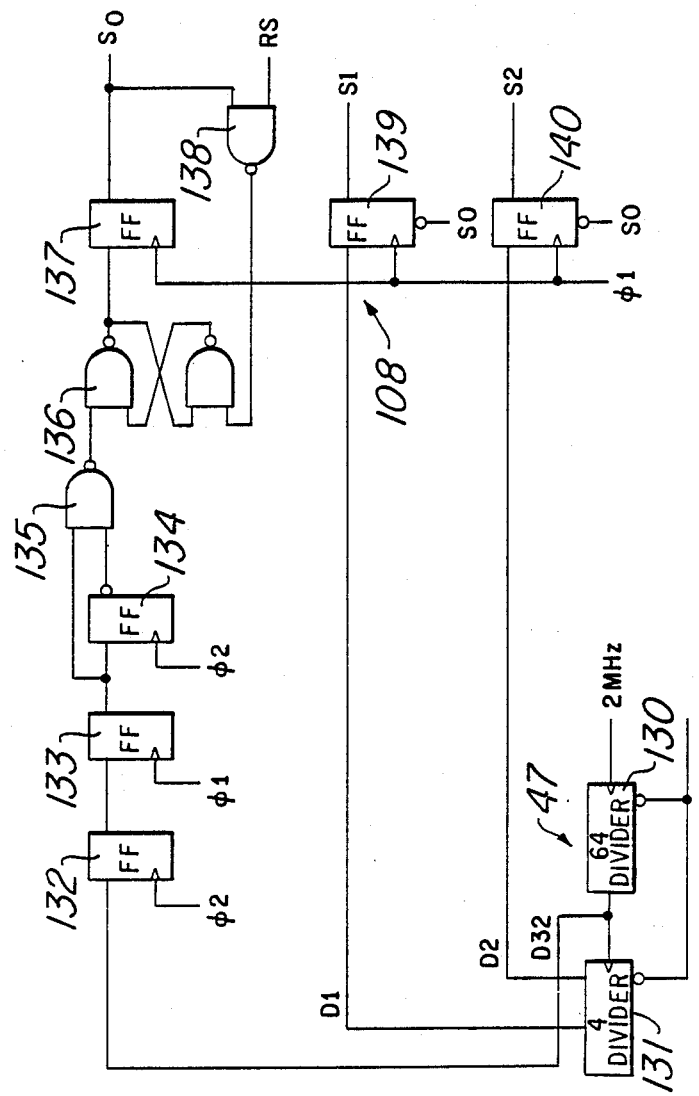
FIG. 24 is a block diagram of the sequencer or synchronizer of the device of FIG. 22.

To implement the technique of simultaneously calculating the filters belonging to several channels, sequencer (47) and synchronizer (48) are constructed as described in reference to FIG. 24.

Sequencer (47) comprises 64 divider (130) to obtain calculation requests D32 at 32 kHz.

Connected to the output of divider (130), 4 divider (131) is used for generating signals D1 and D2 which define the type of calculation to be performed.

The two dividers or counters are initialized by the raster beginning at 8 kHz.

Figure 25:
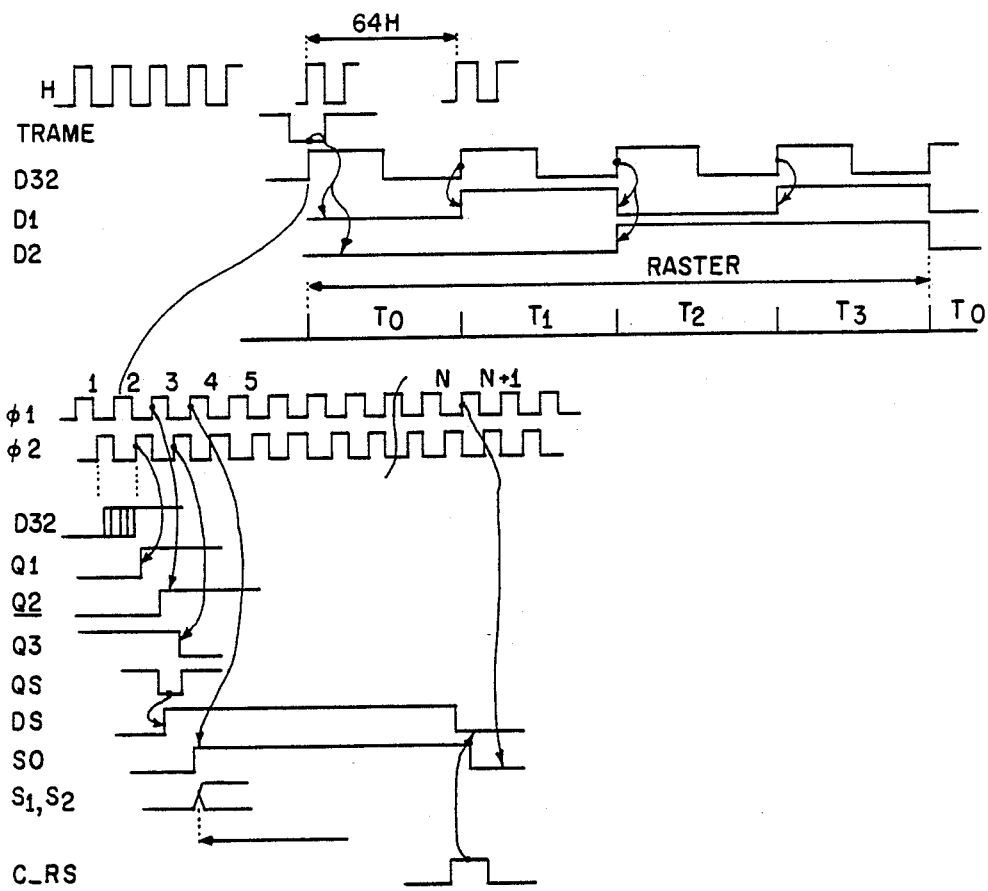
FIG. 25 is a diagram illustrating the functioning of the circuit of FIG. 24.

The operation of the circuit of FIG. 24 is illustrated by the diagram of FIG. 25.

Synchronizer (48) receives calculation request signal D32 and the resynchronizer on high-speed clock signals 01 02 in flip-flops (132–134).

The resynchronized signals are applied via NAND gate (135) to an input of flip-flop (137) generating signal (50).

The latter is applied to the other input of flip-flop (136) via NAND gate (138) which also receives end of calculation RS signal.

Signals S1 and S2 result from the processing of signals D1 and D2 produced by 4 divider (131) by flip-flops (139) and (140) which also receive clock signal 01 and therefore resynchronize signals D1 and D2 on this clock signal.

Synchronizer (48) generates signals S0, S1 and S2 during the entire calculation until signal C.RS clears flip-flop RS (136) then signal S0.

Depending on the position of signal D32 relative to the front of clock signal 02, the resynchronization time may vary between 1.5 and 2.5 rapid clock periods Signal D32 is recorded in circuit Q1 (132) by clock signal 02 with an error margin which depends on the rate of D32 relative to its rise time.

The output of flip-flop Q1 (132) is recorded in circuit Q2 (133) by clock signal 01 which is in quadrature with signal 02.

The error margin in flip-flop Q2 (133) becomes negligible due to the high performance of current high-speed technologies. It is of the order of $10^{-10}$.

As a result synchronous signal D32 of the clock at 2 MHz generates each time synchronous signal S0 of signal 01.

Signal S0 resets flip-flops S1 and S2 (139, 140) according to the following table.

| to | | | | to + 1,5 a 2,5 01 | | |
|---|---|---|---|---|---|---|
| D32 | D1 | D2 | CRS | S0 | S1 | S2 |
| 0 | a | b | 0 | 0 | 0 | 0 |
| 1 | a | b | 0 | 1 | a | b |
| x | x | x | 1 | 0 | 0 | 0 |

Signals S0, S1, and S2 transmitted to CROM memory (49) select one of the four types of calculations T0, T1, T2 or T3, depending on the value of "ab."

Figure 26:
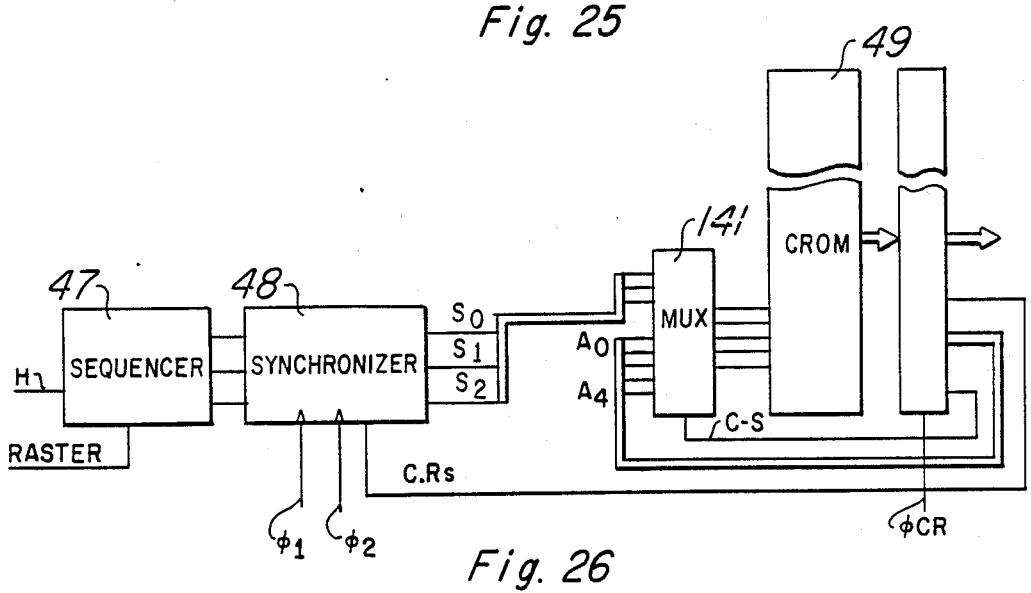
FIG. 26 shows the layout of the part of the circuit of FIG. 22 adapted to control the CROM memory.

In FIG. 26, we have shown the organization of the part of the circuit of FIG. 22 adapted to control CROM memory (49).

We see in this figure that CROM (49) is connected to synchronizer (48) by the multiplexer 141. The address of CROM (49) comes from a multiplexer 141. The address of CROM (49) comes from this multiplexer 141 which receives address signals A0 to A4 coming from the corresponding output of CROM (49) and signals (S0 to S2) coming from synchronizer (48).

Another signal C—S coming from CROM (49) selects:

an unconditional jump if $C-S=1$
a conditional jump if $C-S=0$

1—Initial WAIT condition

| 0 | 0 | 0 | 0 | 0 | 0 | 0 | // |
|---|---|---|---|---|---|---|---|
| A4 | A3 | S0 | S1 | S2 | C-S | C-RS | Microcodes DSP |

The word CROM contains two fields, namely that which is reserved for executing the algorithm and that which is reserved for DSP which will be described below.

The WAIT microcode is located at address 00 of CROM 49.

It contains:

$$A_4 A_3 A_2 A_1 A_0 = 00000$$
$$C - S = 0$$
$$C - S = 0$$
$$C - RS = 0$$

Since $C-S=0$, bits $A_2 A_1 A_0$ are respectively replaced by $S_0$, $S_1$, and $S_2$ coming from synchronizer (48).

As long as signal D32=0, S0=0, which leads to $S_1 S_2 = 0$.

For each clock signal 0, the word of CROM (49) read at address 00 again selects CROM address 00.

The algorithm is in the wait position at address WAIT 00.

The status change of signal D32 causes a switch from S0 to 1 after 1.5 to 2.5 periods of 01.

S0=1 enables signals $S_1$ and $S_2$ which select the type of calculation to be performed according to the following table.

| | | | | | | Nom μCode | Type calcul |
|---|---|---|---|---|---|---|---|
| A4 | A3 | S0 | S1 | S2 | Ad μCode | 1 | 2 |
| 0 | 0 | 1 | 0 | 0 | 04 | LP1 | T0 |
| 0 | 0 | 1 | 0 | 1 | 05 | GR1 | T2 |
| 0 | 0 | 1 | 1 | 0 | 06 | ZI1 | T1 |

-continued

| A4 | A3 | S0 | S1 | S2 | Ad μCode | Nom μCode 1 | Type calcul 2 |
|---|---|---|---|---|---|---|---|
| 0 | 0 | 1 | 1 | 1 | 07 | ZI1 | T3 |

Key:
1-Name;
2-Calculation.

2—Sequence of the algorithm

For all microcodes according to the algorithm of FIG. 21, except for Z15 which functions like the WAIT microcode for selecting branches BD1, BP1, and NOP, each microcode selects the address of the next microcode to be executed by an unconditional jump ($C-S=1$).

3—Return to the WAIT Code

Microcodes NOP, BP4, and GX2 end the execution of a calculation by an unconditional jump to WAIT address 00. In all of these microcodes, bit C-RS which is at 1 clears synchronize (48) and positions S0.S1 and S2 at zero to return to wait position on the wait code until the next calculation request.

We have just described how sequencer (47) and synchronizer (48) select the first microcode of the algorithm to be executed, depending on the values of S1 and S2. The algorithm is executed by CROM memory (49) itself with its jump conditions defined in its address field.

Figure 27:
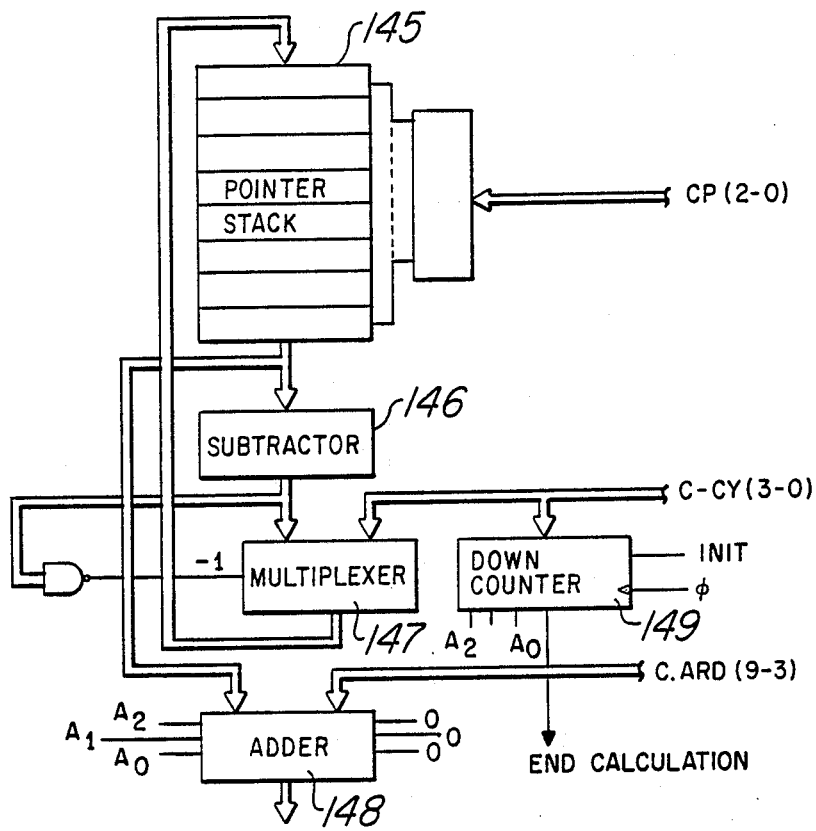
FIG. 27 is a diagram depicting the address process of the device of FIG. 22.

We will now examine how the calculations are carried out to perform the filtering function Address processor (54) of the device of FIG. 22 has as shown in FIG. 27 a stack of eight pointers (145) each of which are used to calculate a different filter Pointer stack (145) is connected by subtracter (146) which decrements the pointer selected for each cycle, for multiplexer (147) controlled by the zero status of the output of subtracter (146) and which selects either the output of the subtracter, or bits C-CY3 to C-CY0 when status −1 is detected at the output of subtracter (146). It also has adder (148) which adds up the value of the pointer under consideration and bits A2, A1, and A0 with seven bits coming from CROM memory (49), C-ARD9 to 3 and downcounter (149) which controls the duration of the calculation sequence of a filter with four coefficients.

Downcounter (149) is positioned at value 4 at the beginning of the cycle.

The address processor shown in FIG. 27 operates as follows.

It makes it possible to advance address ARD 9-0 between two terminals set by the value of C-CY(3–0).

For example, we assume the case of a filter with four coefficients.

For each channel, four multiplications and accumulations must be executed.

|  |  | C-ARD | Pointer | $A_2A_1A_0$ | OPeration |
|---|---|---|---|---|---|
| >000 | xn 7 / xn 6 / // | 0000000 | 0000 | 0 0 0 | |
| >001 | xn 0 / xn−1 7 / xn−1 6 / // | | 0000 / 0001 | 1 1 1 / 0 0 0 | xn(o)xho(o) |
| >010 | xn−1 0 / xn−2 7 / xn−1 6 / // | | 0001 / 0010 | 1 1 1 / 0 0 0 | |
| >011 | xn−2 0 / xn−3 7 / xn−3 6 / // | | 0010 / 0011 | 1 1 1 / 0 0 0 | |
| >011 C-ARD | xn−3 0 | 0000000 | 0011 | 1 1 1 | x(n−3)(o)xh(n−3)(o) |

It is assumed that the microcode selects pointer 0 with bits $C-P(2-0)=000$ and that this pointer contains the value 0011.

The number of coefficients is determined by $C-CY(3-0)=011$ to select four coefficients. $C-CY(3-0)$ is loaded into downcounter (149) by signal INIT and $A_2A_1A_0$ are positioned at 1.

The starting address is 001F since to generate ARD (9-0) the base address C-ARD (9-3) is added with the 7 bits formed by $A_0A_1A_2$ and the contents of the corresponding counter of stack (145).

Sample $x(n-3)$ corresponding to channel "0" is read in data memory (52) (FIG. 22) whereas coefficient $h(n-3)$ is read in coefficient memory (53) at the address generated by an address processor connected to coefficient memory (53).

The sample and coefficient are transmitted to multiplier (58) to perform the first filtering operation.

At the next cycle, downcounter $A_2-A_0$ (149) (FIG. 27) is decremented $A_2A_1 A_0=110$.

The reading address is 001E, data RAM memory (52) contains sample $x(n-3)$ for channel 1.

The sample and coefficient are transmitted to DSP to perform the calculation.

When $A_2A_1A_0=000$, the last sample $xn-3$ is processed then downcounter (149) is decremented.

The pointer is decremented by subtracter (146) $P=0010$. Since the pointer is different than zero, multiplexer (147) selects the output of subtracter 146 and the new value is written in the pointer.

During the next seven cycles, samples $xn-2$ of seven other channels are processed in the same way.

When the pointer is at zero, samples $xn$ are processed.

The output of subtracter (146) is equal to 1111. It controls multiplexer (147) which then selects bits C−CY(3−0) which will be written in the pointer at the end of the reading of eighth sample xn when $A_2A_1A_0=000$.

During the same period, downcounter (149) was decremented and generates end of calculation EOC signal.

The pointer of stack (145) contains value 0011. The pointer therefore circulates between the value programmed by bits C−CY(3−0) and zero.

During the next operation, the eight new samples xn are written in data memory (52) at address 0011 defined by pointer (145) then the latter is decremented to value 0010.

Accordingly, with the next series of calculations, the first sample processed is former x(n−2) which becomes x(n−3) and most recent sample xn took the place of former xn−3.

There is therefore a rotation of the address of the beginning of the calculation:

| 1st Calculation | 1st Write |
|---|---|
| 3 2 1 0 | 3 |
| 2 1 0 3 | 2 |
| 1 0 3 2 | 1 | which makes it possible to keep each time the series of the four most recent samples without having to slide the samples by read/write series during the calculation cycles.

The microcode sequence is shown in FIG. 28.

The sequencer of address processor (54) makes it possible to generate the microcode change by signal $\phi CR$ (FIG. 26).

Downcounter (149) of the address processor generates end of calculation EOC signal when the downcounter is at zero and the eight channels were processed.

The EOC signal should make it possible to change the microcode at the output of CROM memory (49) at instants that can change with the type of operation that controls the microcode.

When the execution of two consecutive microcodes does not require that the contents of the accumulator be saved in data RAM memory (52), the control bit of the sequencer of the address processor is at zero, the EOC signal generates at the beginning of the next cycle the $\phi CR$ signal which loads the microcode at the output of CROM and the INIT signal which loads the downcounter of the address processor and initializes the predowncounter A2-AD to value 7.

When eight accumulators are saved in data RAM memory (52) following calculation microcode MAC (multiplication accumulation), one must wait for the delay caused by the pipeline to pass before being able to access accumulators (115) (FIG. 22) before saving them.

As shown in FIG. 29, the $C-CR=1$ signal in the microcode of operation OP2 delays $\phi CR$ by two clock cycles 01 before enabling the microcode to be changed.

Actually, in 1, the last read operation is performed.

Multiplication 2 is assigned to the next clock cycle, and accumulation 3 is performed two cycles after the reading.

Accumulator stack (115) is only available after the latter. The microcode may then change to transfer the accumulators into RAM 52, to the address specified by the microcode.

In referring again to the diagram of FIG. 22 and to the diagram of FIG. 30 as a function of time, we see that the beginning of sequence To consists of executing microcodes LP1-LP5 corresponding to the low-pass filtering. The eight new samples which were loaded into stack register RE (121) should be transferred into eight accumulators (115a-115h).

Sequencer (47) and synchronizer (48) generate signal So in the manner described in reference to FIG. 24 and the addresses corresponding to the beginning of the sequence of microcode LP1.

The EOC signal generates $\phi CR$ which transfers the microcode selected at the output of memory CROM 49.

At instant 1, counter $A_2-A_0$ (149) of address processor (54) (FIG. 27) is initialized at "7" and downcounter at "0". Register RE7 of stack (121) is transferred to bus (125) by the validation signal coming from CROM (49) and by the address selection signal coming from downcounter $A_2-A_0$ of address processor (54).

Multiplexer (124) transfers the contents of RE7 to the link bus with multiplier (58) under the control of CROM (49). The coefficient selected by address processor (54) is transferred to the linking bus of coefficient memory (53) with multiplier (58).

During the next cycle at instant 2, the contents of register RE7 of stack (121) is multiplied by the coefficient having value 1 by multiplier (58).

The result at the output of multiplier (58) is RE7. During this same cycle, counter $A_2-A_0$ which was decremented selects register RE6 of stack (121) in the same way.

During cycle 3, since the result found at the output of multiplier (58) is loaded into accumulator (115) at the address specified by $A_2-A_0$.

During this same period, sample RES is read in stack (121) and sample RE6 is multiplied by 1.

After eight cycles, counter $A_2-A_0$ is at the zero status. The eight samples were read in stack (121), end of calculation signal EOC is generated to change the microcode at the next cycle.

During the next two cycles, due to the pipeline architecture, samples RE1 and RE0 are transferred to accumulator (115) while the execution of microcode LP2 begins.

The execution of microcode LP2 is identical to the preceding one.

However, the data are read in data RAM (52) at the address specified by address processor (54) which is under the control of CROM (49).

Since there are six coefficients to be multiplied by six of the oldest samples, and the cycle is repeated for eight channels, downcounter (149) is loaded with value 5, it is decremented each time that $A_2-A_0$ is at the zero status, the end of the cycle takes place when $A_2-A_0$ and downcounter (149) are both at zero.

At this instant, the execution of LP2 is completed after 6×8 cycles, and the result should be transferred into data RAM memory (52) at address Dn for the eight samples.

After two wait cycles which make it possible to complete the accumulation of the results in accumulator (115), the transfer of eight samples DN may be carried out.

At the end of the transfer, the calculation sequence of the low-pass filter continues according to the same process.

Sequencer (47) selects one of the four calculation operations and synchronizer (48) generates the input point of CROM (49) by resynchronizing to a high-speed calculation clock.

When a microcode is selected, counter $A_2$-$A_0$ of address processor (54) shares all elements of the circuit to perform eight times the calculation or the operation with a single microcode.

The downcounter makes it possible to repeat this operation N times by changing each time a group of eight data and coefficients.

During a filter calculation at N coefficients, there are $8 \times N$ cycles and only one microcode is used.

In the example just described, the invention is considered to apply to a digital signal-processing device associated with eight subscriber channels.

We naturally see that the application of the invention may be applied to the processing of a larger number of channels by a single digital processing device, provided that the time required to process these channels is compatible with the duration of the sampling raster.

What is claimed is:

1. A digital signal processing device for processing telephonic signals included in a subscriber line card system on a time-shared basis for each of a plurality of subscriber lines forming a group of subscriber lines in the subscriber line card system in providing communication between subscribers via a telephone exchange, said digital signal processing device comprising:

a compressor-expander circuit shared by said subscriber lines included in said group of subscriber lines and connectable to said telephone exchange for insuring the connection of the digital signal processing device to the telephone exchange;

a sequencer circuit responsive to clock signals generated by the telephone exchange and to control signals defining the position of samples of signals of the various subscriber lines in a predetermined period of time for generating orders to calculate various filters for each of the plurality of subscriber lines;

a synchronizer circuit connected to the output of said sequencer circuit for synchronizing the orders to calculate the various filters generated from said sequencer circuit in relation to signals of a local clock and to generate a synchronizing point at the end of a filter calculation in process as an output;

a read-only-memory connected to the output of said synchronizer circuit and having a plurality of microcode sequences stored therein corresponding to the various filter calculations for each of said plurality of subscriber lines;

the address of a first microcode of a particular sequence of microcodes contained in said read-only-memory corresponding to a filter calculation to be effected being determined by the output of said synchronizer circuit as received by said read-only-memory;

a central processing unit responsive to the microcode bits as accessed from said read-only-memory to effect various calculation operations as a function of the configuration of the microcode bits;

a data memory connected to said central processing unit and having samples on which the calculations must be carried out for each filter stored therein at respective data addresses;

a coefficients memory connected to said central processing unit and having coefficients stored therein adapted to be allocated to the data from said data memory as input to said central processing unit for carrying out the calculations of the filters relating to said plurality of subscriber lines; and an address processor operably connected to said read-only-memory and to said data memory and said coefficients memory for managing the data addresses and the coefficients and to select the addresses at which the data are located for presenting the data to said central processing unit in a required order for effecting the corresponding filter calculation.

2. A digital signal processing device as set forth in claim 1, wherein said data memory is a random access memory in which a number N of samples for the calculation of a corresponding number of stages of each filter is stored; and said coefficients memory is a random access read-only-memory in which coefficients corresponding to the calculation of N stages of each filter are stored.

3. A digital signal processing device as set forth in claim 1, wherein said central processing unit has a pipeline type architecture and includes a first processing unit portion for reading data as accessed from said data memory and coefficients as accessed from said coefficients memory;

a second processing unit portion for multiplying the data accessed from said data memory by the corresponding coefficients accessed from said coefficients memory; and a third processing unit portion for summing the results of the multiplication with preceding results.

4. A digital signal processing device as set forth in claim 3, further comprising a data register;

a multiplier connected to said data register;

data bus means connecting said data memory to said data register for transferring data accessed from said data memory by said central processing unit to said multiplier under the control of clock signals;

a coefficients register;

coefficients bus means connecting said coefficients memory to said coefficients register for transferring coefficients accessed from said coefficients memory by said central processing unit to said multiplier under the control of said clock signals; and means for connecting said data bus means and said coefficients bus means with said third processing unit portion including the summing part of said central processing unit.

5. A digital signal processing device as set forth in claim 4, wherein said third processing unit portion defining the summing part of said central processing unit comprises an arithmetic logic unit;

said read-only-memory being connected to said arithmetic logic unit and generating microcode sequences controlling said arithmetic logic unit;

said arithmetic logic unit having a first input connected to said register for transferring the products produced by said multiplier and a second input;

accumulator means comprising at least one accumulator connected to the output of said arithmetic logic unit;

said arithmetic logic unit having a second input connected to said at least one accumulator of said accumulator means for providing the results of the preceding calculation as an input to said arithmetic logic unit;

said arithmetic logic unit being effective to produce the sum of a product of the output of said multiplier with the preceding calculation results stored in said at least one accumulator of said accumulator means; and said accumulator being controlled by said clock signals and having its output connected to said data memory and to said coefficients memory for storing therein the results of calculations of filters effected by said central processing unit.

6. A digital signal processing device as set forth in claim 1, wherein said address processor comprises:

a first address processor portion for said data memory and a second address processor portion for said coefficients memory, each of said address processor portions including a stack of index registers responsive to addresses provided from said read-only-memory for selection of individual index registers from which addresses accessing the corresponding one of said data memory or said coefficients memory are provided;

a subtracter connected to the output of said stack of index registers;

multiplexer means connected to the output of said subtracter and to an output of said read-only-memory delivering signals corresponding to the number of calculation cycles to be effected in relation to the number of stages of a filter to be calculated, said multiplexer means having an output connected to said stack of index registers;

an adder connected to the output of said stack of index registers and to an output of said read-only-memory delivering a basic address signal, the adder associated with said data memory delivering data address signals as subjected to the calculating operations of a filter, and the adder associated with said coefficients memory delivering coefficients address signals whereby the calculation of said filter must be effected; and a decrementing counter connected to the output of said read-only-memory for receiving the number of cycles from said read-only-memory and transmitting an end-of-calculation signal to said central processing unit at the end of the calculation of said filter in response to a predetermined number of counting intervals.

7. A digital signal processing device as set forth in claim 6, wherein each of said address processor portions further includes a logic circuit connected to the output of said stack of index registers for detecting a predetermined value controlling the reloading in said stack of index registers of the value of the number of calculation cycles at the end of the calculation of a filter;

said stack of index registers being thereafter placed in condition for starting a new calculation with the same number of cycles as the preceding calculation.

8. A digital signal processing device as set forth in claim 6, wherein said read-only-memory comprises:

a microcode memory unit;

a decoding unit for selecting one of the microcodes from said microcode memory unit;

selection logic means interposed between said decoding unit and said synchronizer circuit and respectively connected thereto;

said read-only-memory having a data base address output connected to the adder of said address processor portion associated with said data memory and a coefficients base address output connected to the adder of said address processor portion associated with said coefficients memory;

said read-only-memory having a number of calculating cycles output connected to said multiplexer means and to said decrementing counter which delivers the end-of-calculation signal of said address processor; and said read-only-memory further having an output connected to said central processing unit for controlling said central processing unit.

9. A digital signal processing device as set forth in claim 1, wherein said sequencer circuit comprises a counter for receiving a sample signal and a decoder for decompositions of each order into its different filtering frequency elements for each of the samples corresponding to one of said plurality of subscriber lines.

10. A digital signal processing device as set forth in claim 1, wherein said synchronizer circuit is provided with a plurality of channels for recording and managing priorities of the calculating orders as received from said sequencer circuit and places in a standby condition the calculations of lower priority, said synchronizer circuit comprising divider means in each of said channels for dividing by a number corresponding to the number of calculations at said frequency permitting the management of the input points of said read-only-memory corresponding to the calculations managed by said divider means;

a decoder associated with each of said divider means for each calculation order at a given frequency; and each divider means having an output to inhibit the operation of the channels of said synchronizer circuit adapted to control the calculations of lower priority than those controlled by the channel in which the particular divider means is located.

11. A digital signal processing device as set forth in claim 5, wherein said accumulator means at the output of said arithmetic logic unit comprises an accumulator stack having a plurality of accumulators, the number of which is equal to the number of channels to be processed, said accumulators being adapted to respectively contain the results of the filter calculations effected simultaneously for all of the subscriber lines of which an order to place such subscriber lines into communication has been effected in a given time interval; and divider means connected to said accumulator stack for controlling the plurality of accumulators thereof by dividing by a number equal to the number of channels to be processed by said read-only-memory.

12. A digital signal processing device as set forth in claim 11, further including first register stack means comprising a plurality of registers for connection to the telephone exchange;

second register stack means comprising a plurality of registers connected to the corresponding channels of said plurality of subscriber lines, said second register stack means having the same number of registers included therein as the number of channels corresponding to said plurality of subscriber lines for receiving and outputting samples respectively corresponding to said channels of said plurality of subscriber lines at the rhythm of the filtering calculations provided by said central processing unit;

said accumulator stack being connected to a first input of said arithmetic logic unit;

multiplexer means interconnected between said accumulator stack and said first register stack means adapted to be connected to the telephone exchange and between said accumulator stack and said second register stack means connected to the corresponding channels of said plurality of subscriber lines; and bus means interconnecting said accumulator stack and said multiplexer means with said first and second register stack means respectively adapted to be connected to the telephone exchange and to the channels corresponding to said plurality of subscriber lines.

13. A digital signal processing device as set forth in claim 12, wherein said first register stack means includes an output register stack and an input register stack;

signal compressor means interposed between said bus means and said first register stack means in connected relationship to said bus means and said output register stack of said first register stack means; and signal expander means interposed between said bus means and said first register stack means in connected relationship to said bus means and said input register stack of said first register stack means.

14. A digital signal processing device as set forth in claim 12, wherein said multiplexer means connecting said accumulator stack via said bus means with said first and second register stack means are further connected to said multiplier, said data memory, said coefficients memory, and to the inputs of said arithmetic logic unit.

15. A digital signal processing device as set forth in claim 9, wherein said sequencer circuit includes first divider means of a clock frequency for delivering signals ordering the calculation at a frequency equal to the highest frequency of calculation of filtering functions connected to the input of said first divider means;

second divider means connected to the output of said first divider means for generating signals defining the type of calculation to be effected; and said first and second divider means being initialized by a signal indicative of the start of the frame of time intervals containing the subscriber signals to be processed.

16. A digital signal processing device as set forth in claim 15, wherein said synchronizer circuit includes means for re-synchronizing the calculation order signal with rapid clock signals; and means for generating from said re-synchronized calculation order signal and said signals defining the type of calculation to be effected, signals of selection in said read-only-memory of the types of calculations stored in said read-only-memory.

17. A digital signal processing device as set forth in claim 16, further including multiplexer means interposed between said synchronizer circuit and said read-only-memory in interconnected relationship therewith for receiving from said read-only-memory address signals and a jump selecting signal, the value of which determines a standby condition or a condition of the carrying out of a calculation procedure.

18. A digital signal processing device as set forth in claim 11, wherein said address processor comprises a pointer stack including a plurality of pointers equal in number to the number of channels corresponding to said plurality of subscriber lines to be processed, each of said plurality of pointers included in said pointer stack being provided for the calculation of a different filter;

a subtracter connected to the output of said pointer stack for decrementing the pointer selected at each cycle;

multiplexer means connected to the output of said subtracter and controlled by the zero state of the output of said subtracter;

an adder connected to the output of said pointer stack; and a decrementing counter connected to said multiplexer means and to said adder for controlling the duration of the calculation sequence of a filter having a predetermined number of coefficients.

* * * * *